(12) United States Patent
Ogawa et al.

(10) Patent No.: US 7,640,431 B2
(45) Date of Patent: Dec. 29, 2009

(54) METHOD AND APPARATUS FOR DIGITAL WATERMARKING

(75) Inventors: Hiroshi Ogawa, Yokohama (JP); Takao Nakamura, Yokohama (JP); Atsuki Tomioka, Yokohama (JP); Youichi Takashima, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 646 days.

(21) Appl. No.: 10/634,155

(22) Filed: Aug. 4, 2003

(65) Prior Publication Data

US 2005/0175214 A1    Aug. 11, 2005

Related U.S. Application Data

(62) Division of application No. 09/386,993, filed on Aug. 31, 1999, now Pat. No. 6,704,431.

(30) Foreign Application Priority Data

| Sep. 4, 1998 | (JP) | ................................. 10-251193 |
| Feb. 8, 1999 | (JP) | ................................. 11-030540 |
| Feb. 18, 1999 | (JP) | ................................. 11-040713 |
| Apr. 26, 1999 | (JP) | ................................. 11-118072 |

(51) Int. Cl.
    *H04L 9/32* (2006.01)
(52) U.S. Cl. ...................... 713/176; 713/156; 382/100; 382/250; 382/251; 380/54
(58) Field of Classification Search .................. 713/156
    See application file for complete search history.

(56) References Cited

U.S. PATENT DOCUMENTS

| 5,568,570 | A   | 10/1996 | Rabbani |
| 5,875,249 | A   | 2/1999  | Mintzer et al. |
| 5,915,027 | A * | 6/1999  | Cox et al. ...................... 380/54 |
| 6,154,571 | A   | 11/2000 | Cox et al. |
| 6,185,312 | B1* | 2/2001  | Nakamura et al. .......... 382/100 |

(Continued)

FOREIGN PATENT DOCUMENTS

EP    0 855 681    7/1998

(Continued)

OTHER PUBLICATIONS

Frank Hartung, Bernd Girod, "Digital Watermarking of Raw and Compressed Video," 1996.

(Continued)

*Primary Examiner*—Emmanuel L Moise
*Assistant Examiner*—Shewaye Gelagay
(74) *Attorney, Agent, or Firm*—Kenyon & Kenyon LLP

(57) ABSTRACT

A method for embedding digital watermark data in digital data contents includes the steps of obtaining a frequency coefficient of block data of digital data contents, obtaining a complexity of the block data, obtaining an amount of transformation of the frequency coefficient from the complexity and the digital watermark data, and embedding the digital watermark data by transforming the frequency coefficient. In addition, a method for reading digital watermark data includes the steps of calculating a probability of reading '1' or '0' in a read bit sequence by using a test method on the basis of binary distribution, determining the presence or absence of digital watermark data according to the probability, and reconstituting digital watermark data. Another method includes the steps of performing soft decision in code theory by assigning weights to the digital watermark sequence with a weighting function, and reconstituting digital watermark data.

8 Claims, 30 Drawing Sheets

U.S. PATENT DOCUMENTS

| | | | |
|---|---|---|---|
| 6,246,777 B1 | 6/2001 | Agarwal et al. | |
| 6,272,634 B1 * | 8/2001 | Tewfik et al. | 713/176 |
| 6,345,100 B1 | 2/2002 | Levine | |
| 6,373,974 B2 | 4/2002 | Zeng | |
| 6,480,825 B1 | 11/2002 | Sharma et al. | |
| 6,590,996 B1 * | 7/2003 | Reed et al. | 382/100 |
| 6,614,914 B1 * | 9/2003 | Rhoads et al. | 382/100 |
| 6,694,040 B2 * | 2/2004 | Hayashi et al. | 382/100 |
| 6,700,431 B1 * | 3/2004 | Fotouhi et al. | 327/404 |
| 6,983,057 B1 * | 1/2006 | Ho et al. | 382/100 |
| 2001/0031064 A1 | 10/2001 | Donescu et al. | |
| 2002/0114490 A1 | 8/2002 | Taniguchi et al. | |
| 2003/0011684 A1 | 1/2003 | Narayanaswami et al. | |

FOREIGN PATENT DOCUMENTS

| | | |
|---|---|---|
| JP | 10-33239 | 2/1989 |
| JP | 8-305370 | 11/1996 |
| JP | 09-331261 | 12/1997 |
| JP | 10-178642 | 6/1998 |
| JP | 10-210427 | 8/1998 |
| JP | 10-210435 | 8/1998 |
| JP | 10-219236 | 8/1998 |
| JP | 10-257300 | 9/1998 |
| JP | 10-304323 | 11/1998 |
| JP | 10-308867 | 11/1998 |
| JP | 11-018064 | 1/1999 |
| JP | 11-041573 | 2/1999 |
| JP | 11-055639 | 2/1999 |
| JP | 11-069133 | 3/1999 |
| JP | 11-234504 | 8/1999 |

OTHER PUBLICATIONS

Moriya Takehiro, et al.: "Digital Watermarking Schemes Based on Vector Quantization" Proceedings of the IEEE Workshop on Speech Coding for Telecommunications, XX, XX, Sep. 1997, pp. 95-96.

* cited by examiner

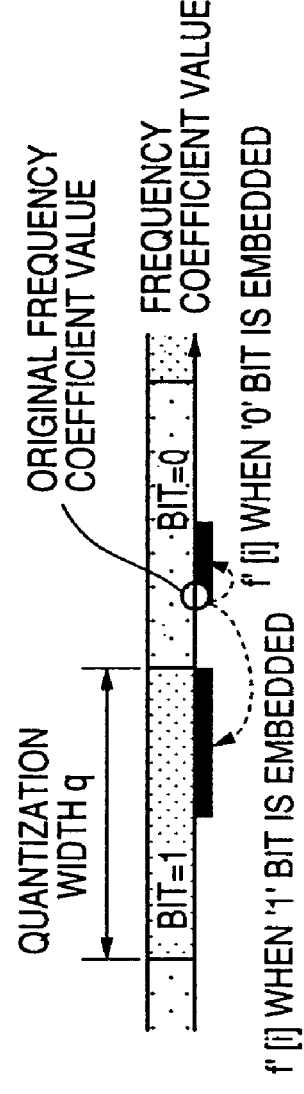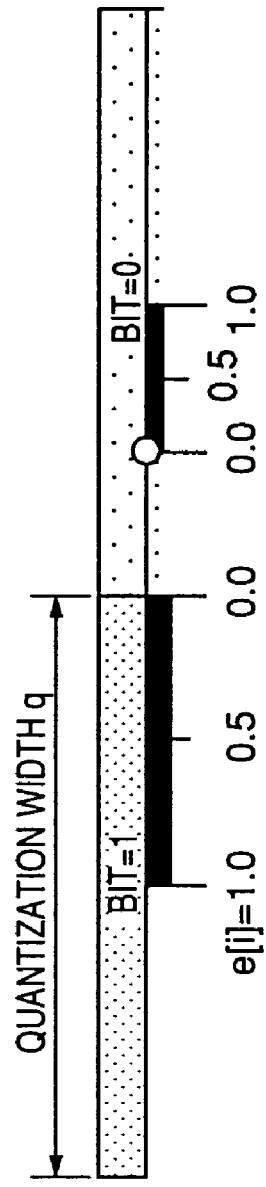
FIG. 11A
FIG. 11B

METHOD AND APPARATUS FOR DIGITAL WATERMARKING

RELATED/PRIORITY APPLICATION INFORMATION

This application claims the benefit and priority of and is a division of U.S. patent application Ser. No. 09/386,993, filed Aug. 31, 1999 now U.S. Pat. No. 6,704,431, which claims foreign priority benefits under 35 U.S.C. § 119 of Japanese Patent Application No. 10-251193, filed Sep. 4, 1998; Japanese Patent Application No. 11-30540, filed Feb. 8, 1999; Japanese Patent Application No. 11-40713, filed Feb. 18, 1999 and Japanese Patent Application No. 11-118072, filed Apr. 26, 1999, all of which are incorporated herein by reference.

BACKGROUND OF THE INVENTION

1. Field of the Invention

The present invention generally relates to a digital watermarking technique. More particularly, the present invention relates to a digital watermarking technique for embedding or reading digital watermark data in digital data contents which represent an image or a sound. In addition, the present invention relates to a technique for statistical processing of read watermark data in a system using the digital watermarking technique.

It is easy to replicate or tamper fraudulently with multimedia production, and the easiness hinders an data content provider from sending data. In addition, some users may not use the data originated from the provider validly. Therefore, copyright protection is strongly needed for the multimedia production. The digital watermarking technique is effective in realizing the copyright protection. According to the digital watermarking technique, sub-data is embedded in data contents without being noticed by a user by utilizing redundancy of data such as of an image and a sound. The digital watermarking technique is used for protecting a multimedia copyright by embedding copyright information, a user ID and the like as the sub-data in secret, since it is difficult to separate the sub-data from the data contents.

2. Description of the Related Art

Conventionally, the following digital watermarking techniques are proposed.

According to a technique proposed in Japanese patent application No. 9-57516, "Image processing method and the apparatus," an image is subdivided into blocks larger than a 8×8 block size which is used for common non reversible compression. Then, the size of the frequency coefficient which is obtained by discrete Fourier transform of the block is changed, the frequency coefficient being represented by a polar coordinate system and the size being a distance from the origin point of the polar coordinate system. As a result, sub-data can be read correctly even when the non-reversible compression is performed. In addition, the frequency coefficient is normalized within a range of predetermined values, is embedded, and read. In addition, weaker image processing is carried out on a complicated region as compared to a flat region. As a result, degradation of image quality which may be caused by embedding the sub-data can be suppressed and a tolerance to contrast changing is obtained. Further, as the value of the frequency coefficient to be changed becomes larger, the modification amount of the frequency coefficient becomes larger (the smaller the value is, the smaller the modification amount is) so as to suppress the deterioration of image quality more effectively. In addition, when subdividing an image into blocks, an image area which is smaller than one block is treated as one block by using an average pixel value and/or using a form symmetric with respect to a line repeatedly to compensate for the lacking image area. Moreover, the sub-data is constituted from the whole image after weighting data of each block. As a result, the sub-data is read correctly even when the image is partly edited and/or the image with many flat parts is non-reversibly compressed.

In addition, according to a technique proposed in Japanese patent application No. 9-164466, "Information embedding method, data reading method and the apparatus," when embedding data into motion pictures, data embedding is carried out to components of a relatively low frequency region. Further, frequency conversion is carried out with a block size larger than a block size used for data compression, and, then data embedding is carried out. Moreover, an original image is used when data is read. As a result, tolerance to data compression is obtained.

Other conventional techniques are proposed in Japanese patent applications No. 8-305370, No. 8-338769, No. 9-9812, No. 9-14388, No. 9-109924, No. 9-197003, No. 9-218467 and No. 10-33239. The digital watermark method is also called data hiding, finger printing steganography, image/sound deep encryption and the like.

Elements for determining performance of the digital watermarking technique are as follows:

(1) quality of data contents in which the digital watermark is embedded;
(2) durability of the digital watermark which is embedded in the data contents when the data contents are manipulated;
(3) safety against intentional erasing of and tampering with digital watermark data, and
(4) reliability of the digital watermark data which is read from the data contents.

The digital watermarking technique is broadly divided into two methods. One method of gives meaning to a data value by quantizing. For example, by dividing a data value by a quantization value and dividing the result by 2, a bit data can be represented by the remainder. Another method embeds digital watermark data by using a spread spectrum method.

The above-mentioned examples are based on the former method. In terms of the method, there is a problem with respect to the above element (1) in that the digital watermark data embedded in the data contents may be perceived, or commercial value of the data contents may be lost by embedding the digital watermark data. With respect to the above element (2), the digital watermark data which is embedded in the data contents may be dissipated even when a general user uses the data contents in a normal way. Particularly, it is a difficult problem to achieve both elements (1) and (2) with enough performance in practical use.

In addition, there is a method of embedding the digital watermark data repeatedly in order to give durability to the digital watermark data against manipulation of the data contents. Specifically, according to the method, digital watermark data which is embedded repeatedly (which is called a watermark sequence hereinafter) is read from data contents, and, then, the digital watermark data is reconstituted by performing statistical processing. The watermark sequence has durability against deterioration and noise to some extent. However, if the data contents are encoded by high compression rates, it may become difficult to read the watermark sequence from the data contents. Therefore, it may become impossible to reconstitute the digital watermark data.

In addition, as for a digital watermarking system, accuracy for determining the presence or absence of embedded data is important. In addition, reliability of embedded data is important. The digital watermarking system generally has a mechanism for reconstituting correct digital watermark data even when sub-data embedded in the data contents is corrupted to a certain extent, since the digital watermarking system assumes various processing on the watermarked data contents. However, under present circumstances, it is impossible for the system to evaluate validity of reconstituted digital watermark data quantitatively. Therefore, the system does not have enough reliability.

SUMMARY OF THE INVENTION

It is a first object of the present invention to improve quality of watermarked digital data contents and to improve durability of digital watermark data against media processing of the watermarked digital data contents.

It is a second object of the present invention to evaluate quantitatively probabilities of cases that data contents which do not contain digital watermark data are wrongly judged as containing digital watermark data, and incorrect digital watermark data is read from watermarked digital data contents.

It is a third object of the present invention to separate a digital watermark data sequence, when reading watermarked digital data contents, from noise so that error bits which are included in the digital watermark data sequence can be reduced, thereby watermark data reading success rate being improved in comparison with the conventional method without changing an amount of digital watermark data and a method of embedding the digital watermark data.

The first object of the present invention is achieved by a method for embedding digital watermark data in digital data contents. The method includes the steps of:

receiving the digital data contents and the digital watermark data;

dividing the digital data contents into block data;

obtaining a frequency coefficient of the block data;

obtaining a complexity of the block data;

obtaining an amount of transformation of the frequency coefficient from the complexity and the digital watermark data by using a quantization width;

embedding the digital watermark data in said digital data contents by transforming the frequency coefficient by the amount; and generating watermarked digital data contents.

The first object of the present invention is also achieved by a method including the steps of:

receiving the digital data contents and the digital watermark data;

dividing the digital data contents into block data;

obtaining a frequency coefficient of the block data;

obtaining an amount of transformation of the frequency coefficient from the digital watermark data by using a quantization width corresponding to the frequency coefficient, the quantization width being obtained beforehand according to a manipulation method of the digital data contents;

embedding the digital watermark data in said digital data contents by transforming the frequency coefficient by the amount; and generating watermarked digital data contents.

According to the above-mentioned inventions, the amount of transformation of frequency coefficients is changed and/or the amount of transformation is increased or decreased according to the complexity of the digital data contents. Therefore, the quality of the watermarked digital data contents can be improved and the durability of digital watermark data against a manipulation of the watermarked digital data contents can be improved.

The second object of the present invention is achieved by a method for reading digital watermark data embedded in digital data contents, the method including the steps of:

receiving the digital data contents;

reading a bit sequence from the digital data contents;

calculating a probability of reading a bit '1' or a bit '0' in the bit sequence by using a test method on the basis of binary distribution;

determining the presence or absence of digital watermark data according to the probability; and reconstituting and generating the digital watermark data from the bit sequence.

According to the above-mentioned invention, probabilities of the following cases can be evaluated quantitatively. The cases are that digital data contents which do not contain digital watermark data are wrongly judged as containing digital watermark data, and incorrect digital watermark data is read from watermarked digital data contents. In addition, the probability can be suppressed within a constant value.

The third object of the present invention is achieved by a method for reading digital watermark data from digital data contents in which each bit of digital watermark data is embedded a plurality of times, the method including the steps of:

receiving digital data contents;

reading a digital watermark sequence from the digital data contents;

performing soft decision in code theory by assigning weights to the digital watermark sequence with a weighting function;

reconstituting the digital watermark data from the digital watermark sequence.

According to the above-mentioned invention, the digital watermark data sequence is separated from the noise so that error bits which are included in the digital watermark data sequence can be reduced, thereby the digital watermark data reading success rate being improved in comparison with the conventional method. In addition, since weights are assigned to the digital watermark data sequence, the present invention is especially effective when the repeating number of watermark embedding is small.

BRIEF DESCRIPTION OF THE DRAWINGS

Other objects, features and advantages of the present invention will become more apparent from the following detailed description when read in conjunction with the accompanying drawings, in which:

FIGS. 11A and 11B are conceptual diagrams of the digital watermark embedding process according to the first embodiment of the present invention;

DETAILED DESCRIPTION OF THE PREFERRED EMBODIMENTS

Before explaining embodiments of the present invention, definition of some words will be given. "Digital watermark data sequence" represents a data sequence read from the digital data contents before being reconstituted. "Digital watermark data" represents significant data for system operation, which data needs to be embedded in the digital data contents, or, data obtained by reconstituting the digital watermark sequence. "Reliability $\alpha$ of digital watermark" is an index representing validity. of read digital watermark data. That is, it represents a probability that the read digital watermark data matches with the actual embedded digital watermark data. Conversely, a probability of reading digital watermark data from an image without digital watermark data or reading erroneous digital watermark data can be represented as $2(1-\alpha)$. Similarly, "embedded sequence" represents data to be actually embedded. The embedded sequence includes sequence of embedded data which is modulated, extended or repeated. In addition, "read" may be replaced with "extract" in some cases.

Figure 1:
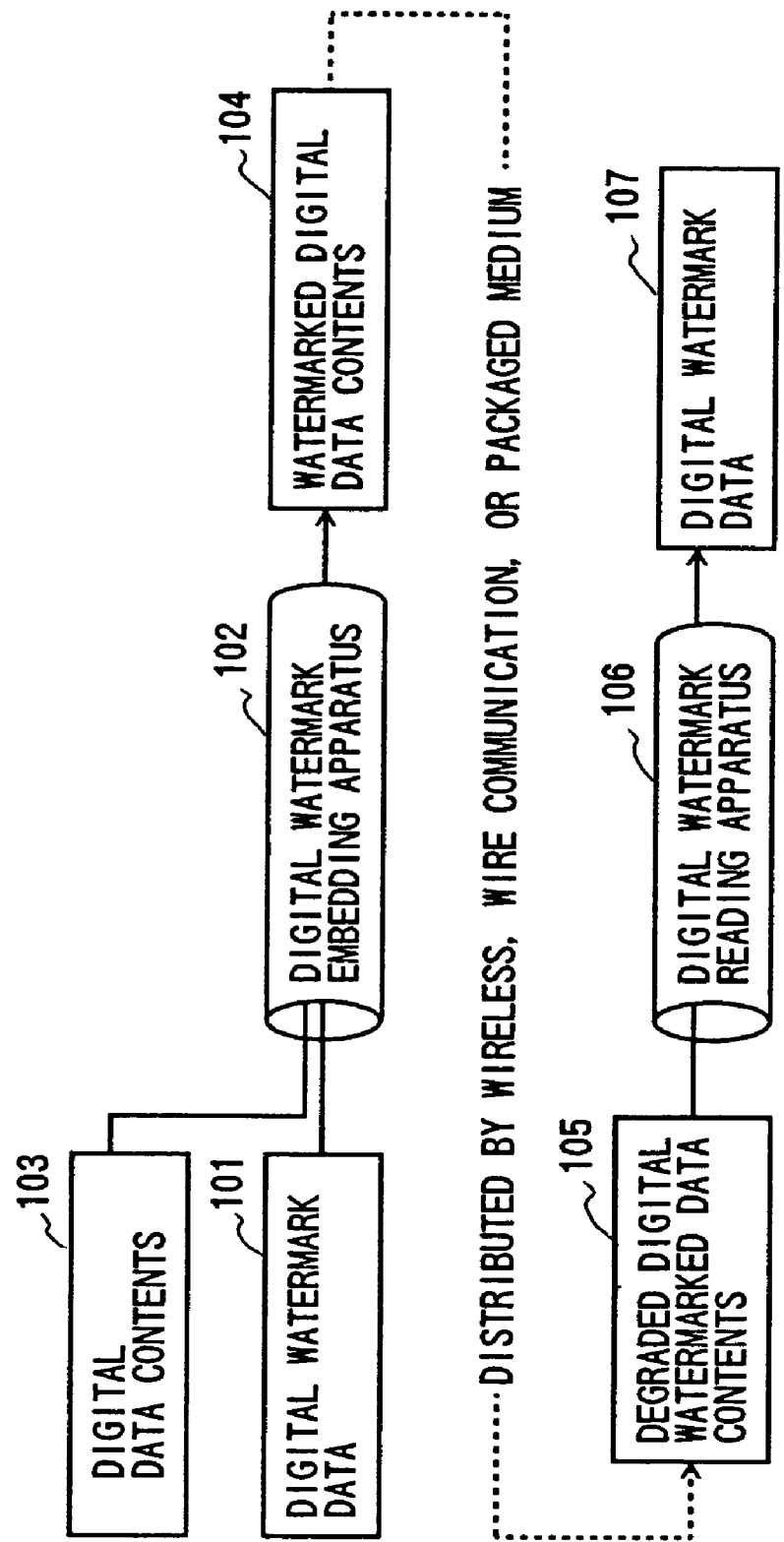
FIG. 1 is a block diagram of a digital watermarking system of the present invention.

FIG. 1 shows a digital watermarking system of the present invention. In the system shown in FIG. 1, digital watermark data 101 is embedded in digital data contents 103 by a digital watermark embedding apparatus 102, then, converted into watermarked digital data contents 104.

The watermarked digital data contents 104 are degraded to watermarked digital data contents 105 by compression or image processing while the watermarked digital data contents 104 are distributed by wireless or wire communication or by a packaged medium.

A digital watermark reading apparatus 106 reads a watermark sequence from the degraded watermarked digital data contents 105, and reconstitutes digital watermark data 107.

In the following, a digital watermark embedding method and a digital watermark reading method by using quantization will be described, since embodiments of the present invention are based on the methods. After the description of the methods, the embodiments of the present invention will be described.

According to the digital watermarking technique based on quantization, digital watermark data is embedded by quantizing all or a part of data which is transformed (for example, by an orthogonal transform) from original digital data contents, or not-yet-transformed data. As for digital watermark data reading, data in the contents in which digital watermark data is embedded is quantized by the same value as a value used for embedding digital watermark data, and, then digital watermark data is determined from the quantized data value.

In the following, a general outline of the methods will be described. The Japanese patent application No. 9-57516, "Image processing method and the apparatus", and the Japanese patent application No. 9-164466, "Information embedding method, data reading method and the apparatus", and the like can be referred to for obtaining detailed information of the digital watermarking technique based on quantization.

Figure 2:
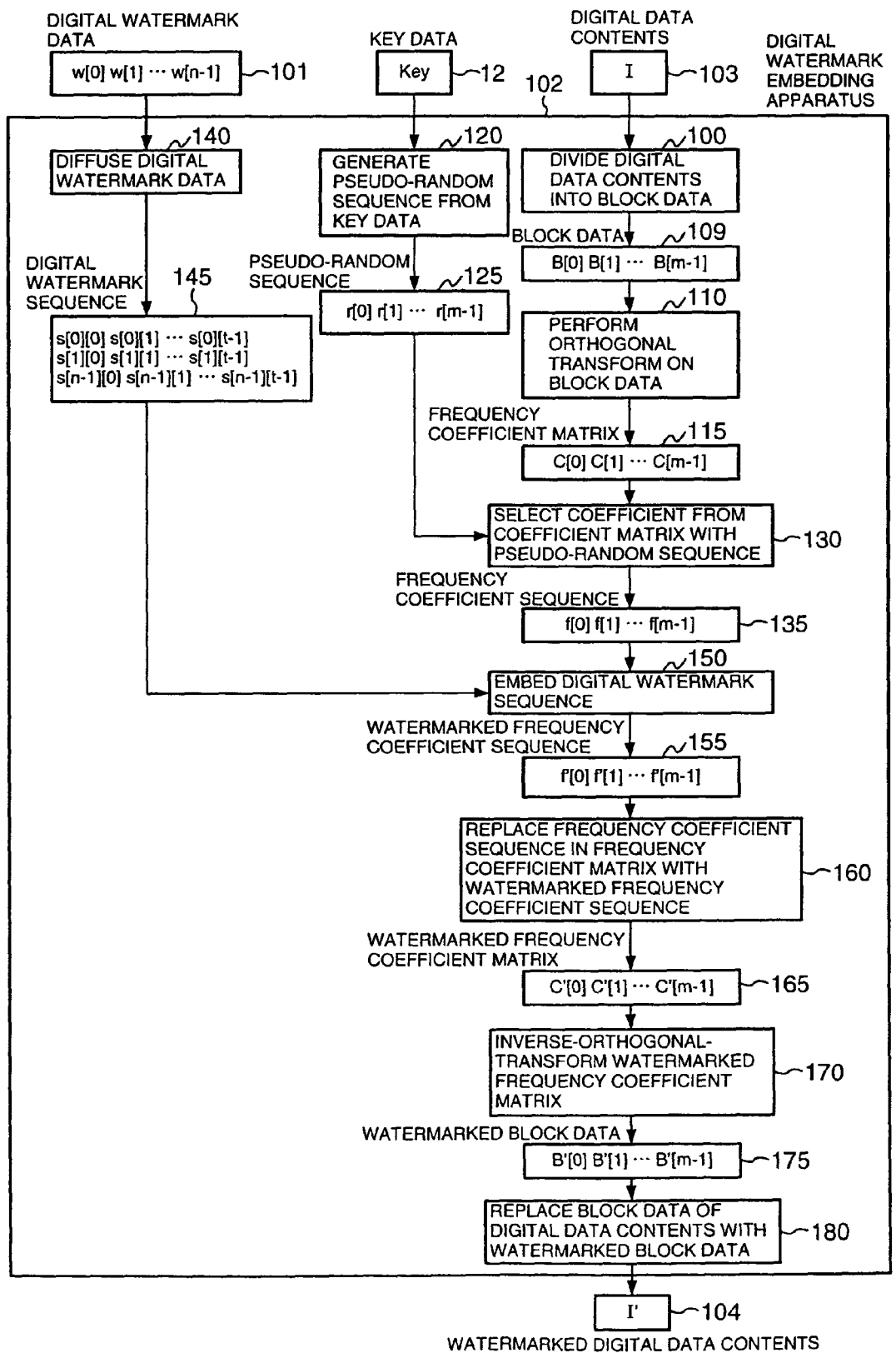
FIG. 2 is a general flowchart showing a digital watermark embedding process according to a conventional technique.

First, digital watermark embedding method based on quantization will be described. A process of the method is carried out by the digital watermark embedding apparatus 102 shown in FIG. 1. FIG. 2 is a flowchart showing the process.

The digital watermark embedding apparatus 102 obtains block data 109 by dividing digital data contents 103 into a plurality of blocks (m blocks in this example) in step 100. Then, a frequency coefficient matrix 115 (an orthogonal transform coefficient matrix) is generated by performing an orthogonal transform on the block data 108 in step 110.

A pseudo-random sequence 125 is generated from input key data 12 in step 120. Then, a coefficient (for each block) from the coefficient matrix 115 is selected one by one using the pseudo-random sequence 125 so as to generate a frequency coefficient sequence 135 to be watermarked in step 130. Each bit of the digital watermark data 101 are diffused by repeating number (t) of embedding so that a digital watermark sequence 145 is generated in step 140. The digital watermark sequence 145 is embedded into the frequency coefficient sequence 135 such that a watermarked frequency coefficient sequence 155 is generated in step 150.

After that, the frequency coefficient sequence 135 in the frequency coefficient matrix 115 is replaced by the watermarked frequency coefficient sequence 155 to generate a watermarked frequency coefficient matrix 165 in step 160. Then, the watermarked frequency coefficient matrix 165 is inverse-orthogonal-transformed to form a watermarked block data 175 in step 170. After that, the block data part of the input digital data contents 103 is replaced by the watermarked block data 175 in step 180. As a result, a watermarked digital data contents is output.

In the above description, data in which digital watermark data is embedded is assumed to be the coefficient of the frequency coefficient matrix. However, the data can be a pixel. In addition, when selecting a coefficient value from a block image, the number of the selected coefficient is not limited to one, that is, it can be more than one or zero. The present invention does not depend on the matter.

In the process of diffusing the digital watermark data shown in FIG. 2, for example, a process represented by s[j][k]=w[j] is carried out for all j and k, then, the digital watermark data (w[0],w[1], . . . ,w[n-1]) is transformed to the digital watermark data sequence s[0] [0],s[0] [1], . . . ,s[0] [t-1],s[1] [0],s[1] [1], . . . ,s[1] [t-1],s[n-1] [0],s[n-1] [1], . . . , s[n-1] [t-1].

In the watermark embedding process, quantization widths of frequency coefficients q[0],q[1], . . . ,q[m-1] are used.

Figure 3:
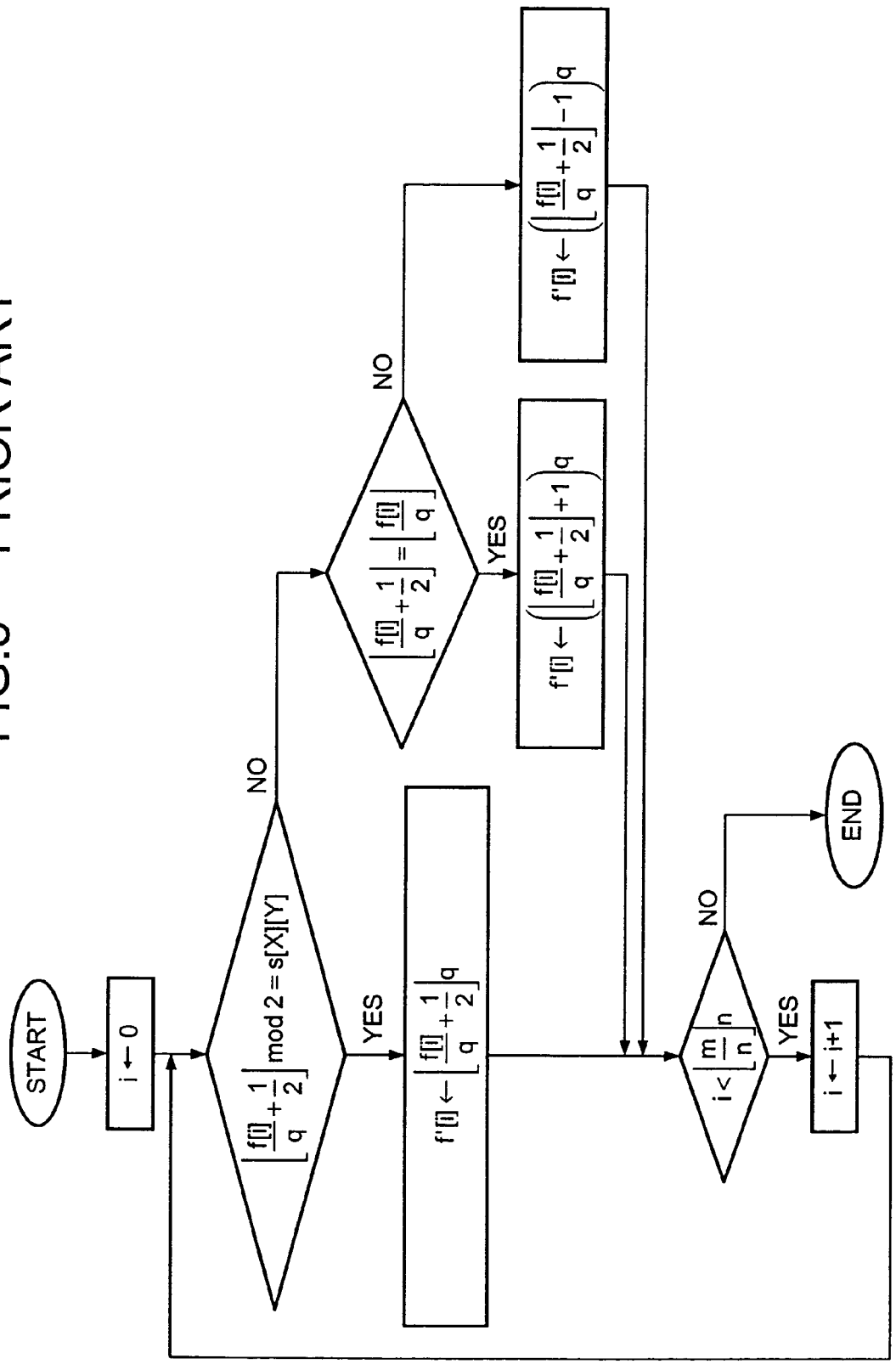
FIG. 3 is a detailed flowchart showing a principal part of the digital watermark embedding process according to the conventional technique.

In the following, the watermark embedding process (step 150) will be described in detail with reference to a flowchart shown in FIG. 3.

Let the repeating number t of each bit of the digital watermark data be $$t = \left\lfloor \frac{m}{n} \right\rfloor,$$

the frequency sequence be w[j],s[j] [k] ∈{0,1} {0≦j<n, 0≦k<t}.

The watermark embedding process to the frequency sequence {f[i]} is carried out as follows.

1. Following steps are carried out for all $$i\left(0 \leq i < \left\lfloor \frac{m}{n} \right\rfloor \cdot n \right).$$

2. A watermarked frequency coefficient f'[i] is obtained from the frequency coefficient f[i] according to following steps.

i) If $\left\lfloor \frac{f[i]}{q} + \frac{1}{2} \right\rfloor \mod 2$ is equal to $s[X][Y]$, $$f'[i] \leftarrow \left\lfloor \frac{f[i]}{q} + \frac{1}{2} \right\rfloor \times q.$$

ii) If $\left\lfloor \frac{f[i]}{q} + \frac{1}{2} \right\rfloor \mod 2$ is different from $s[X][Y]$ and $\left\lfloor \frac{f[i]}{q} + \frac{1}{2} \right\rfloor$ is equal to $\left\lfloor \frac{f[i]}{q} \right\rfloor$, $$f'[i] \leftarrow \left( \left\lfloor \frac{f[i]}{q} + \frac{1}{2} \right\rfloor + 1 \right) \times q.$$

iii) If $\left\lfloor \frac{f[i]}{q} + \frac{1}{2} \right\rfloor \mod 2$ is different from $s[X][Y]$ and $\left\lfloor \frac{f[i]}{q} + \frac{1}{2} \right\rfloor$ is different from $\left\lfloor \frac{f[i]}{q} \right\rfloor$, $$f'[i] \leftarrow \left( \left\lfloor \frac{f[i]}{q} + \frac{1}{2} \right\rfloor - 1 \right) \times q.$$

Here, X=i/t and Y=i mod t. In addition, ⌊x⌋ represents a maximum number which does not exceed x and x mod y represents the remainder of x divided by y.

Figure 4:
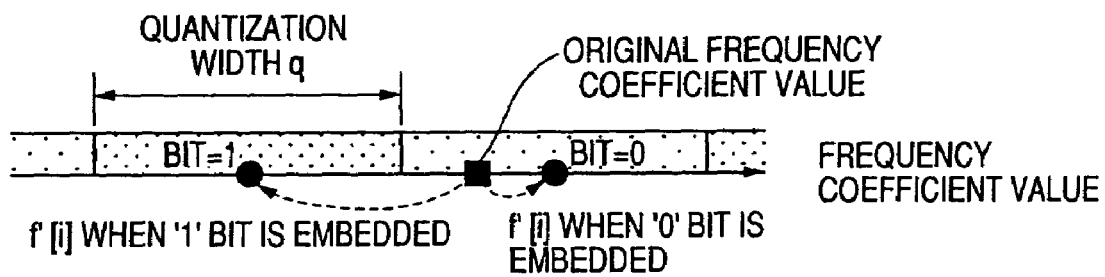
FIG. 4 is a conceptual diagram of the digital watermark embedding process according to the conventional technique.

FIG. 4 shows the concept of the conventional watermark embedding process. As shown in the figure, digital watermark data is embedded by changing a data value of watermarking area to a central value of the quantization width.

Next, the digital watermark reading method based on quantization will be described. The process is carried out in the digital watermark reading apparatus 106. According to the digital watermark reading process, a digital watermark data sequence is read from watermarked contents, and, then digital watermark data is reconstituted by statistically processing the digital watermark data sequence.

Figure 5:
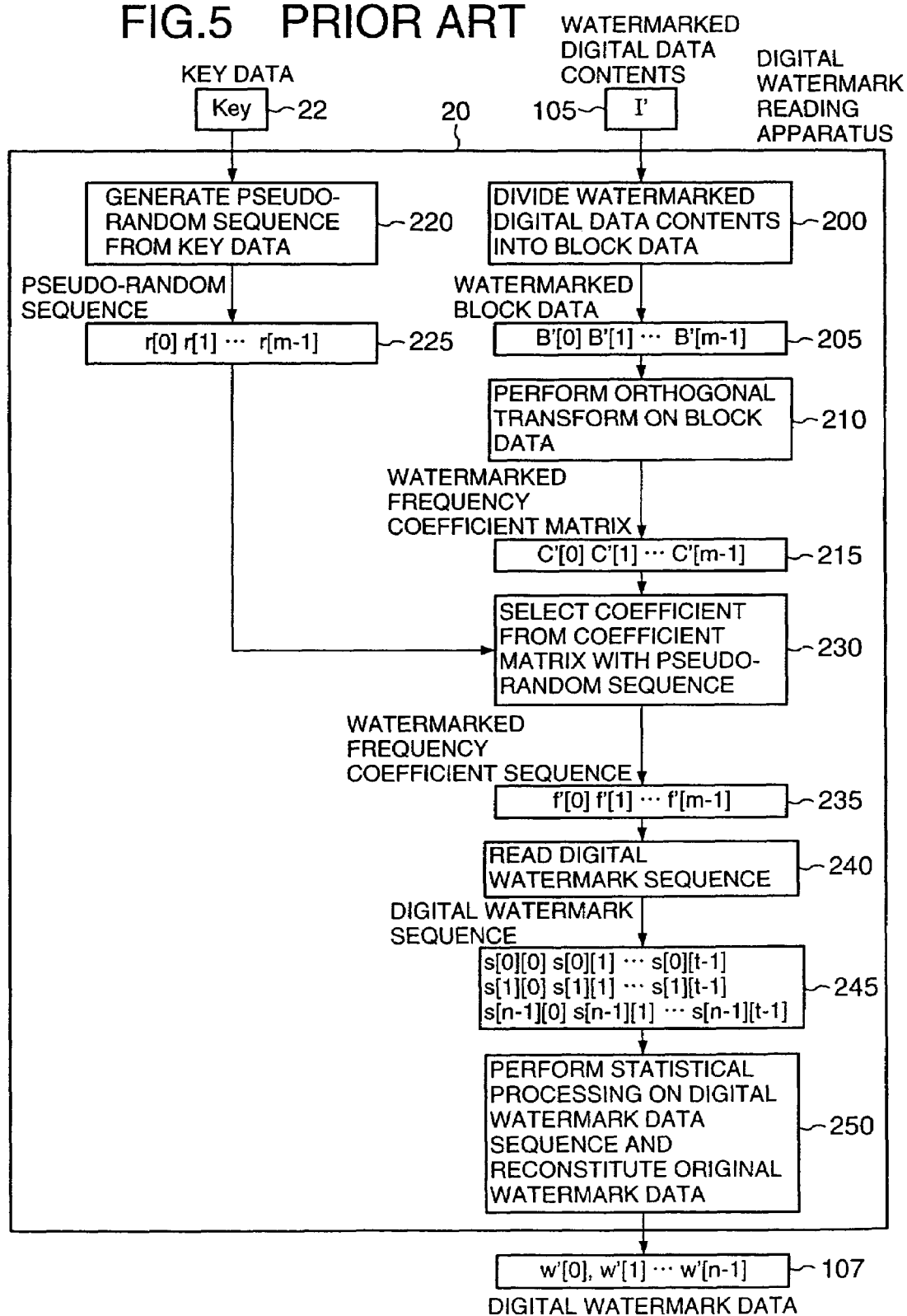
FIG. 5 is a general flowchart showing a digital watermark reading process according to the conventional technique.

FIG. 5 is a flowchart showing the conventional digital watermark reading process based on quantization.

The digital watermark reading apparatus 106 obtains watermarked block data 205 by dividing watermarked digital data contents 105 into a plurality of blocks (m blocks in this example) in step 200. Then, a frequency coefficient matrix 215 is generated by performing an orthogonal transform on the watermarked block data 205 in step 210.

A pseudo-random sequence 225 is generated from input key data 22 in step 220. Then, a coefficient value (for each block) of the frequency coefficient matrix 215 is selected one by one using the pseudo-random sequence 225 so as to generate a watermarked frequency coefficient sequence 235 in step 230. Then, the watermark reading process is performed on the watermarked frequency sequence 235 so that a digital watermark sequence 245 is read in step 240. Finally, the original watermark data 107 is output by performing statistical processing on the digital watermark data sequence in step 250.

Figure 6:
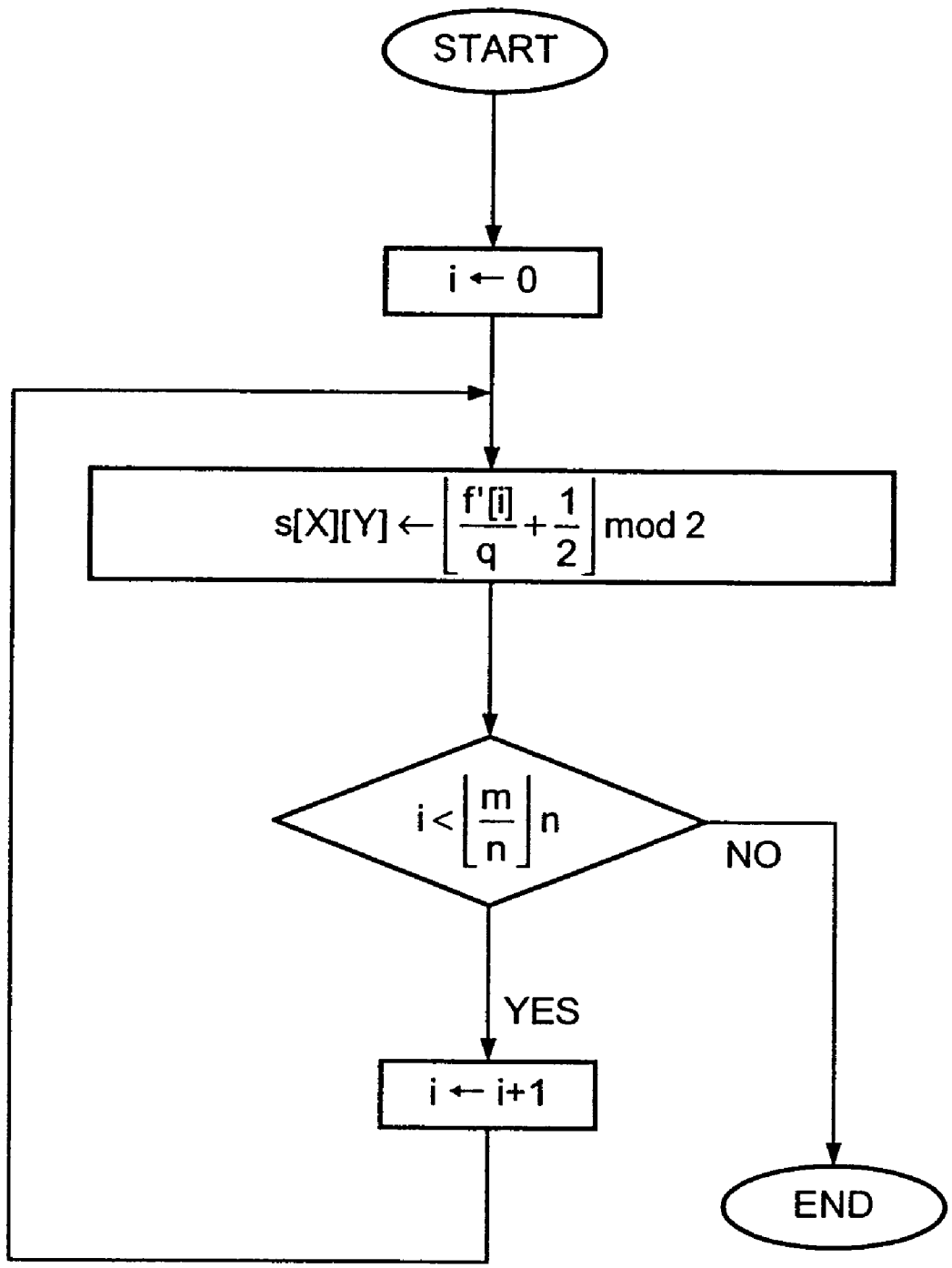
FIG. 6 is a detailed flowchart showing a principal part of the digital watermark reading process according to the conventional technique.

Next, the digital watermark reading process (step 240) will be described in detail with reference to a flowchart in FIG. 6. The process for reading the digital watermark sequence from the watermarked frequency coefficient sequence {f'[i]} is shown in the following.

1. Following steps are carried out for all $$i\left(0 \leq i < \left\lfloor \frac{m}{n} \right\rfloor \cdot n\right)$$

by using a frequency coefficient quantization width q.

2. The digital watermark sequence s[X][Y] is read from the frequency coefficient f'[i]. That is, $$s[X][Y] = \left\lfloor \frac{f'[i]}{q} + \frac{1}{2} \right\rfloor \mod 2.$$

Here, $X = \left\lfloor \frac{i}{t} \right\rfloor$ $Y = i \mod t$.

When the digital watermark data is reconstituted from the digital watermark data sequence by performing statistical processing, a majority decision method such as $$W[j] = \begin{cases} 1 & \sum_{k=0}^{t-1} s[j][k] \geq \frac{t}{2} \\ 0 & \sum_{k=0}^{t-1} s[j][k] < \frac{t}{2} \end{cases} \quad (0 \leq j < n)$$

is used.

Next, the present invention corresponding to the first object will be described.

Figure 7:
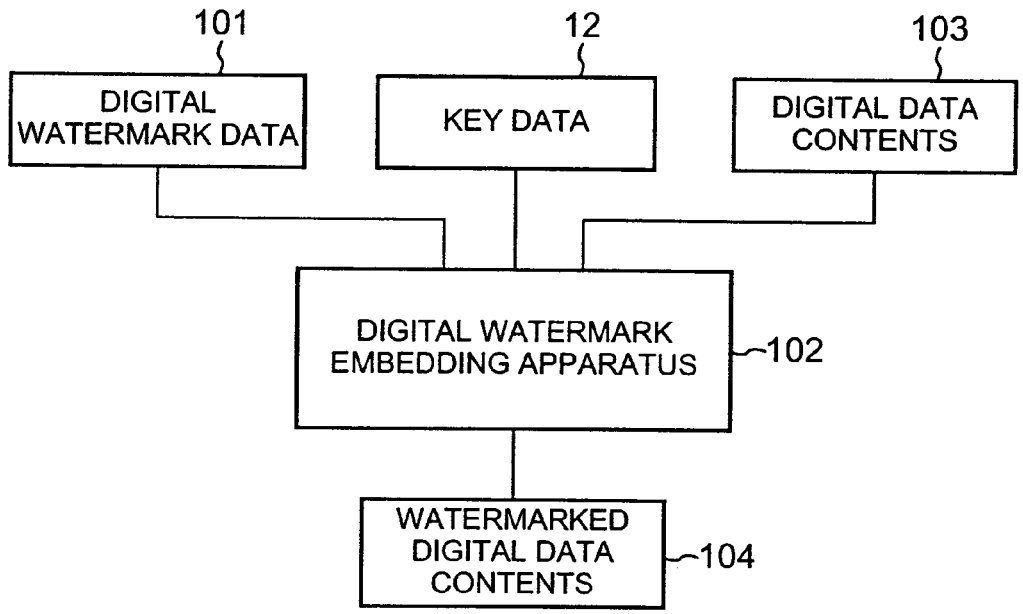
FIG. 7 is a block diagram showing receiving data and generating data of a digital watermark embedding apparatus of the present invention.

FIG. 7 is a block diagram showing input data and output data of the digital watermark embedding apparatus of the present invention. The digital watermark embedding apparatus 102 inputs digital data contents 103 such as an image and a sound as main data, key data 12 and digital watermark data 101 as sub-data. The digital watermark embedding apparatus 102 embeds digital watermark data 101 into the digital data contents 103 and outputs watermarked digital data contents 104.

Figure 8:
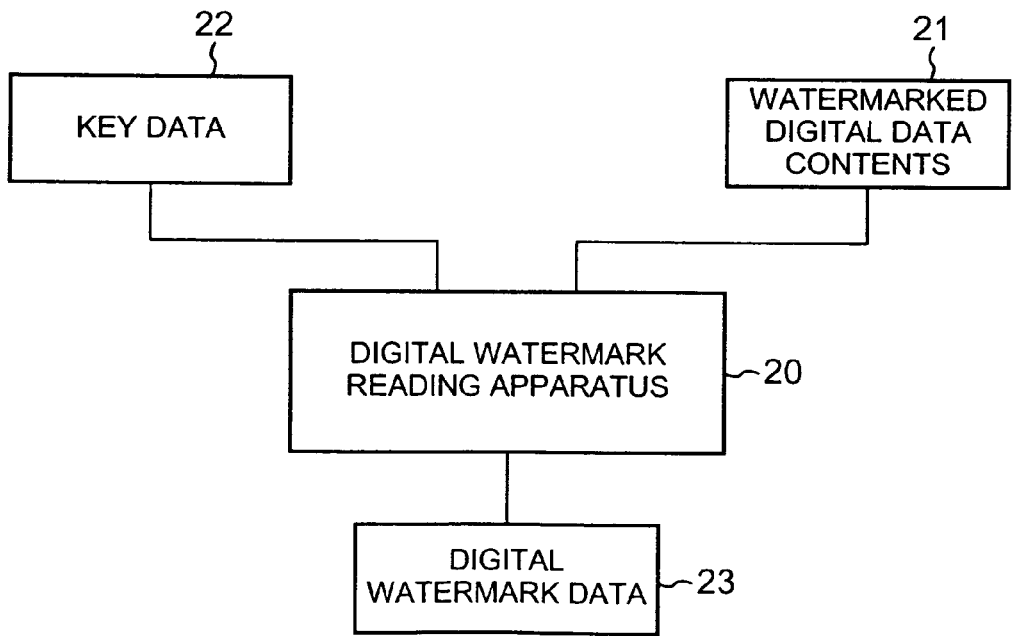
FIG. 8 is a block diagram showing receiving data and generating data of a digital watermark reading apparatus of the present invention.

FIG. 8 is a block diagram showing input data and output data of the digital watermark reading apparatus of the present invention. The digital watermark reading apparatus 20 inputs the watermarked digital data contents 21 and the key data 22, and outputs digital watermark data 23 embedded in the watermarked digital data contents 21. Here, the key data 22 is the same as the key data 12.

In the following, embodiments of the present invention will be described.

First Embodiment

A first embodiment of the present invention will be described. According to the first embodiment, digital data contents and digital watermark data is received and the digital data contents are divided into block data. Then, a frequency coefficient of the block data and the complexity is obtained. Next, an amount of transformation of the frequency coefficient is obtained from the complexity and the digital watermark data by using a quantization width, and the digital watermark data is embedded by transforming the frequency coefficient by the amount. Then, watermarked digital data contents is generated.

The process of the first embodiment is a modified process of the digital watermark embedding process shown in FIG. 2, in which the modified part is the main part for watermark embedding.

Figure 9:
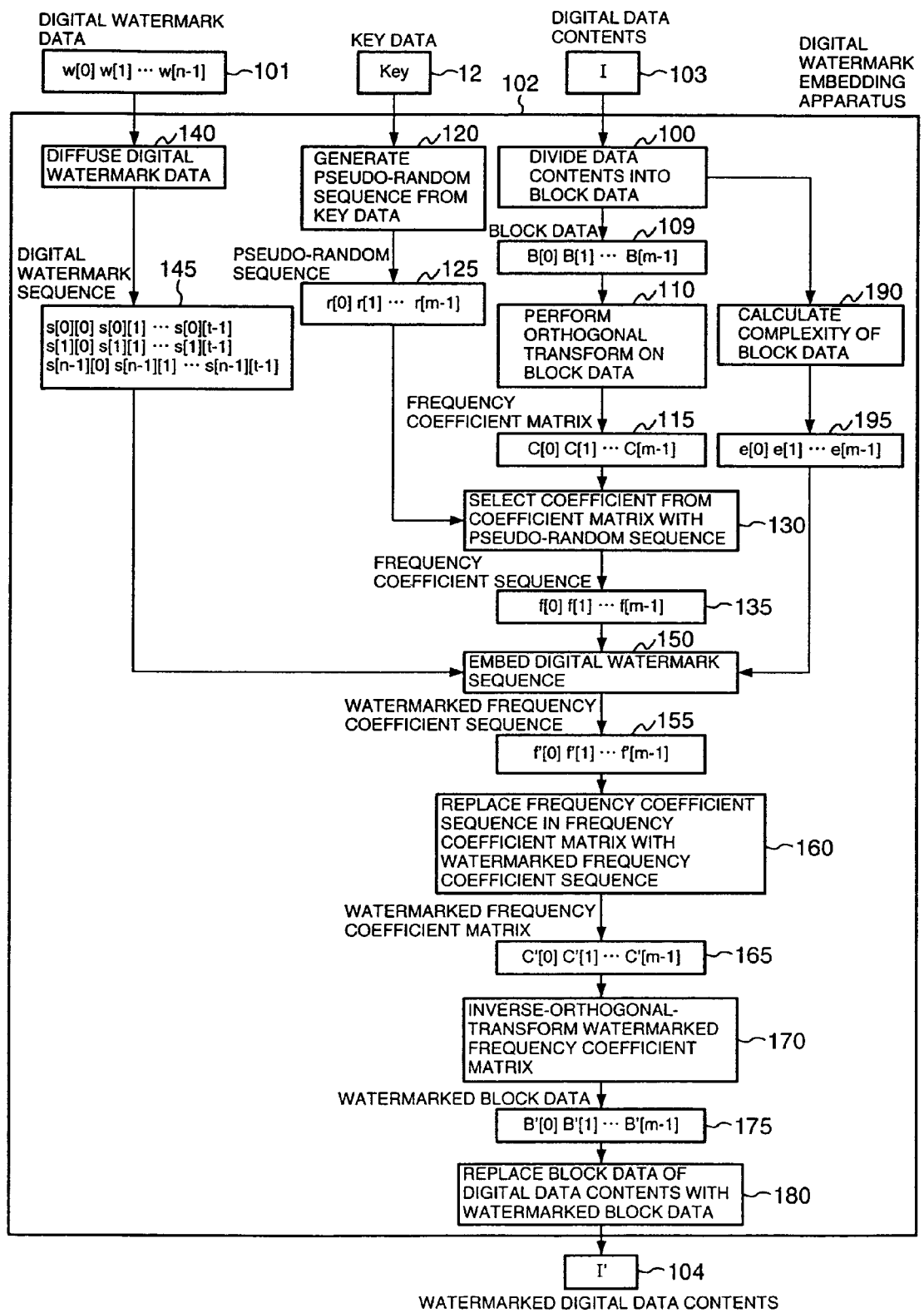
FIG. 9 is a general flowchart showing a digital watermark embedding process according to a first embodiment of the present invention.

FIG. 9 is a flowchart of the whole process of the first embodiment. In FIG. 9, a step 190 which calculates the complexity and a watermark embedding process for varying the transformation amount according to the complexity (steps 195, 150) are different from the conventional process shown in FIG. 2. Therefore, the different point will be mainly described in the following.

Block data 108 is input, and a complexity sequence 195 is generated by calculating a data complexity e[i](0≦e[i]≦1) for each block data in step 190. Then, the coefficient value of data to be watermarked is transformed to a value within quantization width according to the data complexity. In this embodiment, it is possible to use a conventional method for calculating the data complexity. For example, in the case of an image, a process for obtaining local image complexity can be used. In this case, it is necessary to normalize the range of the local complexity such that the range becomes from 0 to 1, if the range is from −α to +β.

Figure 10:
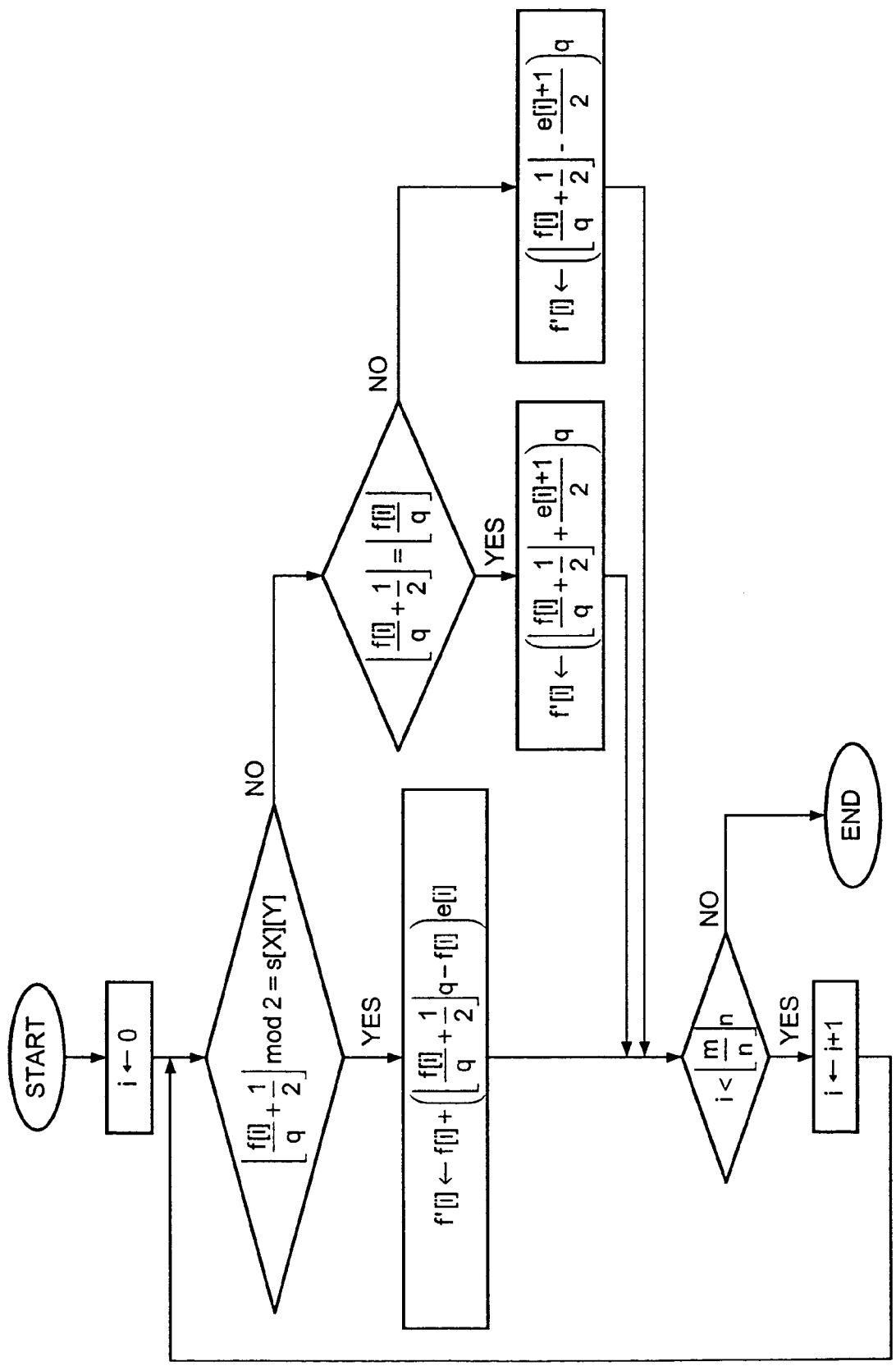
FIG. 10 is a detailed flowchart showing a principal part of the digital watermark embedding process according to the first embodiment of the present invention.

Next, the watermark embedding process which is the heart of the second embodiment will be described in detail. FIG. 10 is a flowchart showing the watermark embedding process (step 150 in FIG. 9) in detail.

The process for embedding digital watermark data into a frequency coefficient sequence {f[i]} of the first embodiment is carried out as follows.

1. For all $$i\left(0 \leq i < \left\lfloor \frac{m}{n} \right\rfloor \cdot n\right),$$

the following process is carried out.

2. A watermarked coefficient f'[i] is obtained from a coefficient f[i].

i) If $\left\lfloor \frac{f[i]}{q} + \frac{1}{2} \right\rfloor \mod 2$ is equal to $s[X][Y]$, $$f'[i] \leftarrow f[i] + \left(\left\lfloor \frac{f[i]}{q} + \frac{1}{2} \right\rfloor \times q - f[i]\right) \times e[i].$$

ii) If $\left\lfloor \frac{f[i]}{q} + \frac{1}{2} \right\rfloor \mod 2$ is not equal to $s[X][Y]$ and $\left\lfloor \frac{f[i]}{q} + \frac{1}{2} \right\rfloor$ is equal to $\left\lfloor \frac{f[i]}{q} \right\rfloor$, $$f'[i] \leftarrow \left(\left\lfloor \frac{f[i]}{q} + \frac{1}{2} \right\rfloor + \frac{e[i]+1}{2}\right) \times q$$

iii) If $\left\lfloor \frac{f[i]}{q} + \frac{1}{2} \right\rfloor \mod 2$ is not equal to $s[X][Y]$ and $\left\lfloor \frac{f[i]}{q} + \frac{1}{2} \right\rfloor$ is not equal to $\left\lfloor \frac{f[i]}{q} \right\rfloor$, $$f'[i] \leftarrow \left(\left\lfloor \frac{f[i]}{q} + \frac{1}{2} \right\rfloor - \frac{e[i]+1}{2}\right) \times q.$$

Here, q represents the quantization width for digital watermark data embedding, X=i/j, Y=imodt, and ⌊x⌋ is the maximum integer which does not exceed x, and x mod y represents the remainder of x divided by y.

FIGS. 11A and 11B are conceptual diagrams showing the digital watermark embedding process of the first embodiment. As shown in FIG. 11B, a data complexity $e[i](0 \leq e[i] \leq 1)$ is calculated for each block data, then, the value of data in which digital watermark data is embedded is transformed to a value within the quantization width according to the data complexity.

Generally, the quality of the watermarked digital data contents is a trade-off for the strength of the digital watermark data. However, according to the present invention, both of the quality of the watermarked digital data contents and the watermark durability can be improved while keeping the quality and the durability in balance. That is, digital watermark data is embedded according to the local data complexity. Specifically, digital watermark data is embedded with a greater strength in a complex part, and is embedded with a weaker strength in a non-complex part.

The watermarking technique has an embedding process and a reading process in a pair. However, even if the embedding process is modified from the conventional process according to the present invention, the reading process does not need to be changed from the conventional reading process for reading the digital watermark data which is embedded by the method of the present invention.

Second Embodiment

In the following, a second embodiment of the present invention will be described. The second embodiment relates to the process for calculating the data complexity (step 190 in FIG. 9).

According to the second embodiment, the block data is transformed by applying Wavelet transform. Then, high frequency coefficient data of the wavelet transformed data is filtered by using a threshold value, and the complexity of the block data is calculated from the number of the data values which exceed the threshold.

Figure 12:
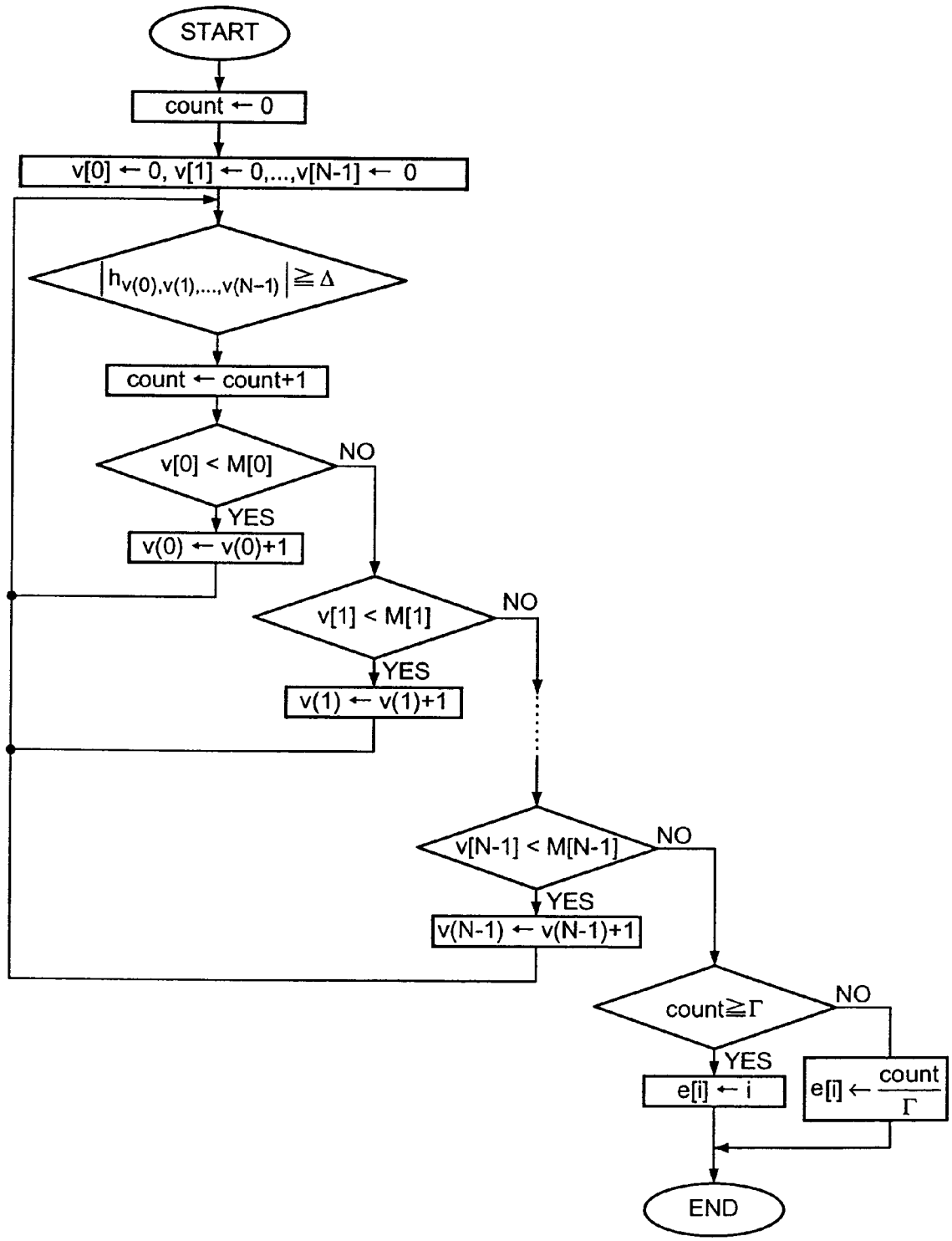
FIG. 12 is a flowchart of a process for calculating a data complexity according to a second embodiment of the present invention.

FIG. 12 is a flowchart of the process for calculating the data complexity according to the second embodiment. Here, let the dimension of a block data B[i] be N, and let the size of the block data be $M_0 \times M_1 \ldots \times M_{N-1}$. A following process is performed on each element $h_{v_0,v_1,\ldots,v_{N-1}}(0<v_u<M_u/2, 0<u<N)$ of the high frequency coefficient matrix $H_0 \times H_1 \ldots \times H_{N-1}$ of N dimensional wavelet transformed block data.

1. count←0
2. For all $(v_0, v_1, \ldots, v_{N-1})$, a step 3 is carried out (N dimensional loop).
3. For a threshold $\Delta \geq 0$ which is set beforehand, If $|hv_0, v_1, \ldots, v_{N-1}| \geq \Delta$, count←count+1. Here, |X| represents the absolute value of x.
4. For a threshold $\Gamma \geq 0$ which is set beforehand, If count$\geq \Gamma$, e[i]←1.0 If not, $$e[i] \leftarrow \frac{count}{\Gamma}.$$

In the process for calculating the data complexity, for example, if it is assumed that N=2 (an image), the basis of the wavelet transform is the Haar basis, $M_0=16$ and $M_1=16$, an experiment shows that values of $\Delta=4$ and $\Gamma=16$ are good for the balance for embedding digital watermark data without being notified by a human.

According to the second embodiment, the above-mentioned function can be realized by setting the two thresholds $\Delta$ and $\Gamma$ according to the characteristics of the watermarking technique such as the kind of data to be watermarked, a unit (the size of the block data), the kind of orthogonal transform to be used. By applying the above-mentioned function to the watermarking technique, it becomes possible to embed digital watermark data more appropriately according to characteristics of individual digital data contents.

Third Embodiment

In the following, a fourth embodiment of the present invention will be described.

According to the third embodiment, in the digital watermark embedding process, block data of digital data contents is obtained, and a transformation amount of frequency coefficient is calculated on the basis of a transformation amount for each frequency band according to a manipulation method of the digital data contents. Then, block data of the watermarked digital data contents is generated.

Let the dimension of a block data B[i] be N and the size be $M_0 \times M_1 \ldots \times M_{N-1}$. Here, a sequence which represents the ratio of transformation width for the frequency band of each frequency coefficient needs to be obtained beforehand by using adequate digital data contents before operating a digital watermarking system. The calculation method for obtaining q[i] will be described in detail in a fifth embodiment later.

Figure 13:
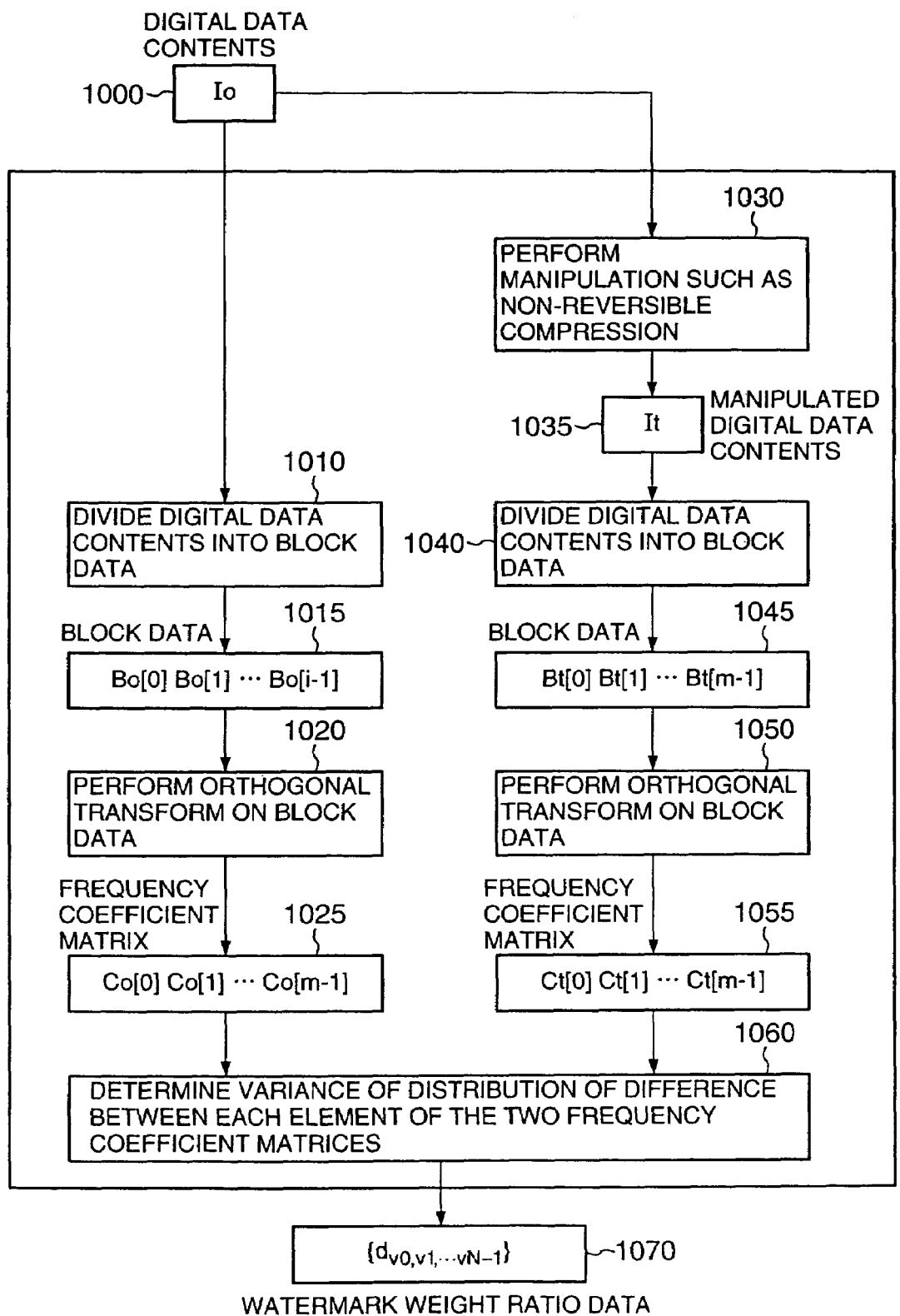
FIG. 13 is a flowchart showing a process for obtaining a watermark weight ratio data according to the present invention.

FIG. 13 is a flowchart for obtaining the ratio of the quantization with for each frequency band. First, digital data contents 1000 is input, and block data 1015 is obtained by dividing the input digital data contents into blocks in step 1010. The block data 1015 is transformed to first frequency coefficient matrices by applying the orthogonal transform in step 1020. Next, digital data contents 1035 is generated by performing a manipulation such as non-reversible compression on the digital data contents 1000 in step 1030. Then, block data 1045 is generated by dividing the digital data contents 1035 into blocks in step 1040. Second frequency matrices 1055 is generated by applying the orthogonal transform to the block data 1015 in step 1055. Then, the variance of the distribution of the difference between each element of the frequency coefficients matrices 1025 and each element of the frequency coefficients matrices 1055 is obtained in step 1060. Finally, watermark weight ratio data d $v_0, v_1, \ldots, v_{N-1}$ 1070 which represents the ratio of transformation for each frequency coefficient is obtained. The watermark weight ratio data obtained in this way is stored, and it is used in a watermark embedding process and a watermark reading process as necessary. The quantization width is obtained as $dv_0, v_1, \ldots, v_{N-1} \times$Power which will be described next.

Figure 14:
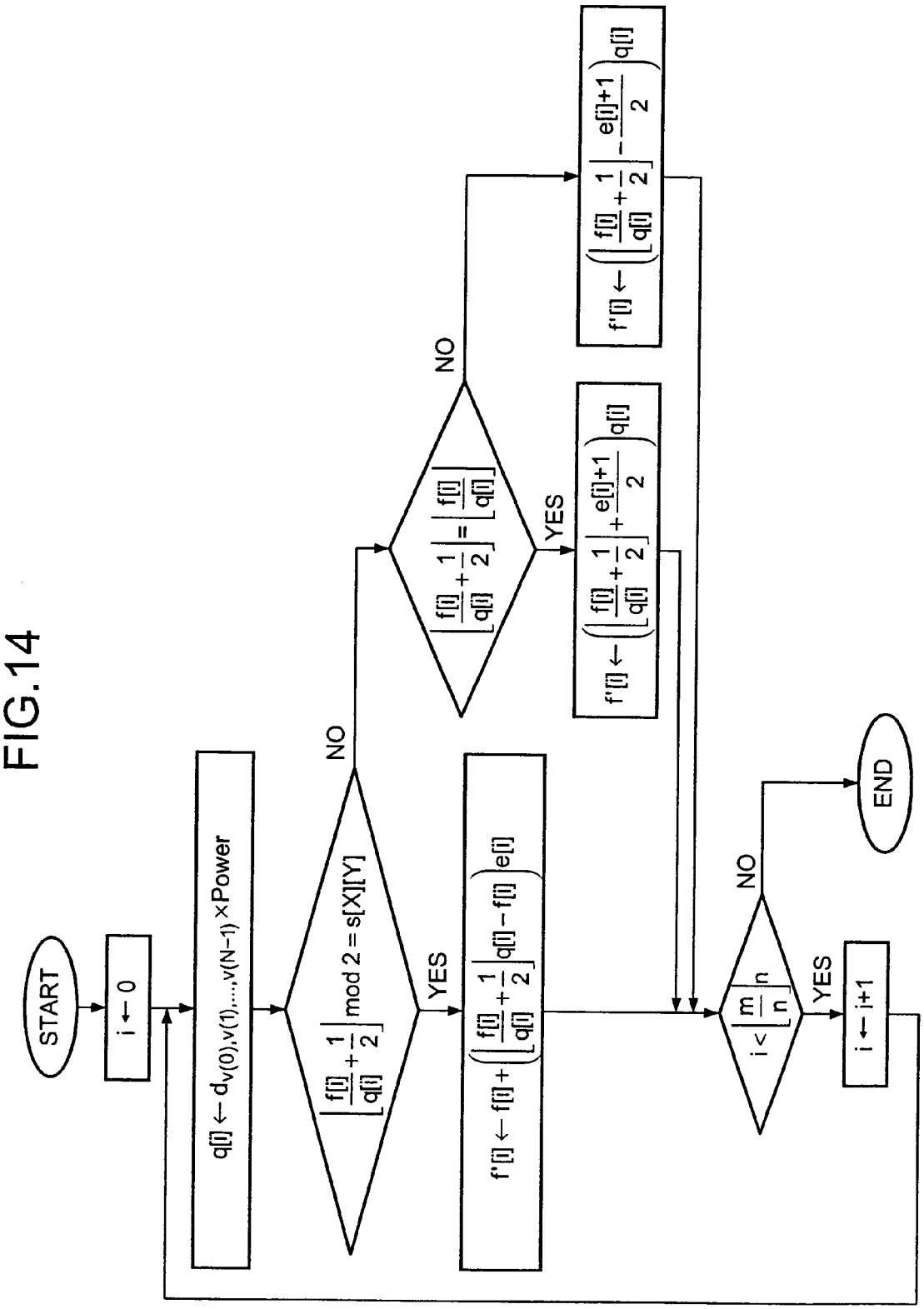
FIG. 14 is a detailed flowchart showing a principal part of the digital watermark embedding process according to a third embodiment of the present invention.

FIG. 14 is a flowchart showing the watermark embedding process which is the heart of the third embodiment of the present invention. Here, the flow of the whole process is the same as that shown in FIG. 2 or FIG. 9.

Let the watermark weight ratio sequence be $\{dv_0, v_1, \ldots, v_{N-1}\}$ $(0 \leq v_u < M_u, 0 \leq u < N)$, and let the watermark strength be Power (the watermark strength represents durability of digital watermark data against manipulations of watermarked digital data contents.)

The watermark embedding process of the embodiment is carried out as follows.

1. For all $$i\left(0 \leq i < \left\lfloor \frac{m}{n} \right\rfloor \cdot n\right),$$

a following process is carried out.

2. A quantization width q[i] used when embedding digital watermark data into the frequency coefficient f[i] is obtained by q[i]←dv$_0$,v$_1$, . . . ,v$_{N-1}$×Power by using an element dv$_0$, v$_1$, . . . ,v$_{N-1}$ of the watermark weight ratio sequence which corresponds to the band of the frequency coefficient f[i] (f[i] is a (v$_0$,v$_1$, . . . ,v$_{N-1}$)th component of the frequency coefficient matrices).

3. The watermarked frequency coefficient f'[i] is obtained from the frequency coefficient f[i] in the following way.

i) If $\left\lfloor \frac{f[i]}{q[i]} + \frac{1}{2} \right\rfloor$ mod 2 is equal to $s[X][Y]$, $$f'[i] \leftarrow \left\lfloor \frac{f[i]}{q[i]} + \frac{1}{2} \right\rfloor \times q[i].$$

ii) If $\left\lfloor \frac{f[i]}{q[i]} + \frac{1}{2} \right\rfloor$ mod 2 is not equal to $s[X][Y]$ and $\left\lfloor \frac{f[i]}{q[i]} + \frac{1}{2} \right\rfloor$ is equal to $\left\lfloor \frac{f[i]}{q[i]} \right\rfloor$, $$f'[i] \leftarrow \left( \left\lfloor \frac{f[i]}{q[i]} + \frac{1}{2} \right\rfloor + 1 \right) \times q[i]$$

iii) If $\left\lfloor \frac{f[i]}{q[i]} + \frac{1}{2} \right\rfloor$ mod 2 is not equal to $s[X][Y]$ and $\left\lfloor \frac{f[i]}{q[i]} + \frac{1}{2} \right\rfloor$ is not equal to $\left\lfloor \frac{f[i]}{q[i]} \right\rfloor$, $$f'[i] \leftarrow \left( \left\lfloor \frac{f[i]}{q[i]} + \frac{1}{2} \right\rfloor - 1 \right) \times q[i].$$

Here, X=i/t, Y=i mod t, and $\lfloor x \rfloor$ is the maximum integer which does not exceed x, and x mod y represents the remainder of x divided by y.

Fourth Embodiment

In the following, a fourth embodiment of the present invention will be described.

The fourth embodiment is a watermark reading process corresponding to the watermark embedding process of the third embodiment. According to the fourth embodiment, block data of watermarked digital data contents is obtained, and digital watermark data is read from frequency coefficients on the basis of transformation amount for each frequency band according to a manipulation method of the digital data contents.

Figure 15:
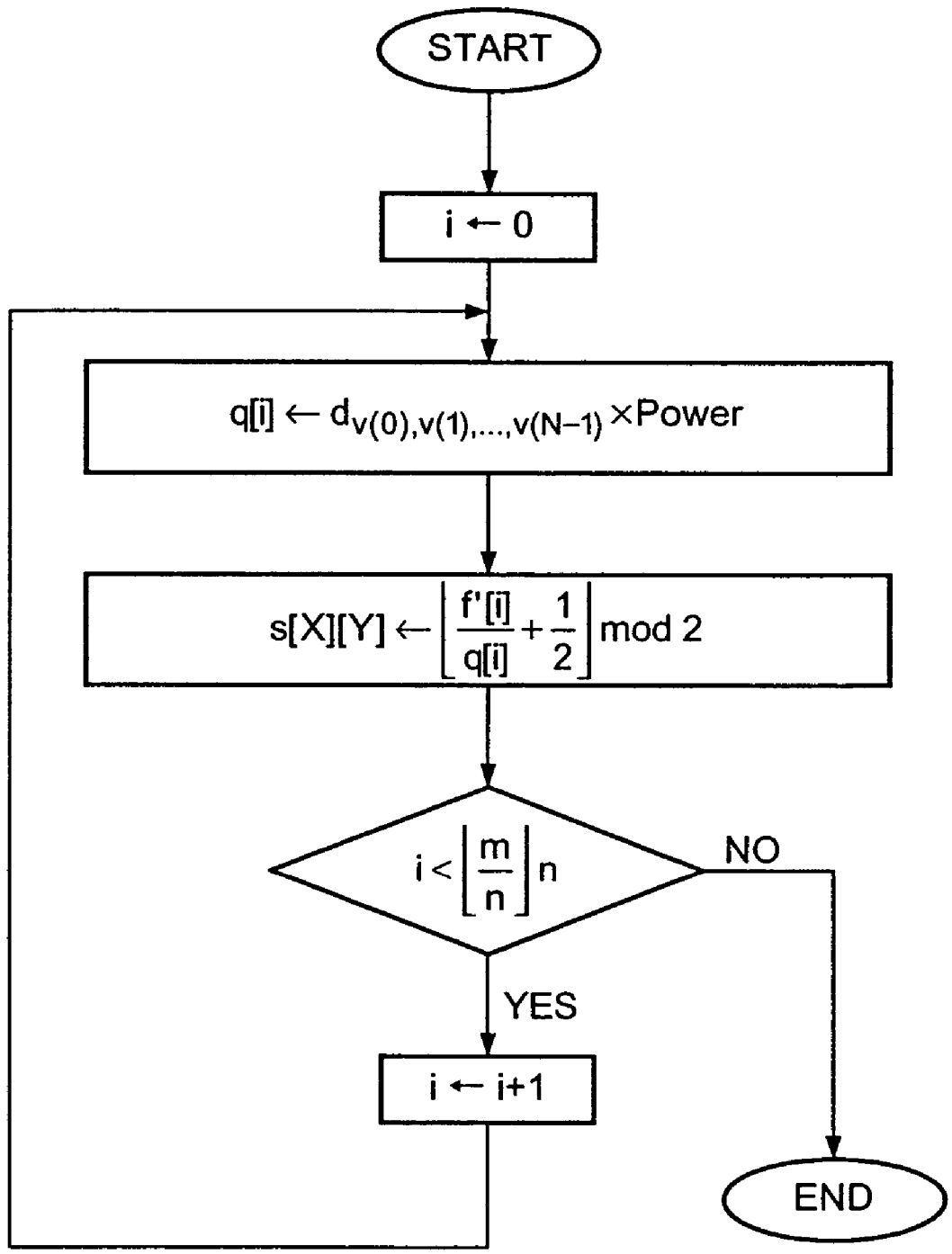
FIG. 15 is a detailed flowchart showing a principal part of the digital watermark reading process according to a fourth embodiment of the present invention.

FIG. 15 is a flowchart showing the watermark reading process of the fourth embodiment of the present invention. Here, as in the case of the third embodiment, let the watermark weight ratio sequence be $\{dv_0, v_1, \ldots, v_{N-1}\}$ ($0 \leq v_u < M_u$, $0 \leq u < N$), and let the watermark strength be Power (the watermark strength represents durability of digital watermark data against manipulations such as non-reversible compression to watermarked digital data contents.)

The process for reading the digital watermark data sequence from the watermarked frequency coefficient according to the fourth embodiment is carried out as follows.

1. For all $$i \left( 0 \leq i < \left\lfloor \frac{m}{n} \right\rfloor \cdot n \right),$$

a following process is carried out.

2. A quantization width q[i] used when reading digital watermark data from the frequency coefficient f'[i] is obtained by q[i]←dv$_0$,v$_1$, . . . ,v$_{N-1}$×Power by using an element dv$_0$,v$_1$, . . . ,v$_{N-1}$ of the watermark weight ratio sequence which corresponds to the band of frequency coefficient f[i] (f[i] is a (v$_0$,v$_1$, . . . ,v$_{N-1}$)th component of the frequency coefficient matrices).

3. The digital watermark data sequence s[X] [Y] is read from the watermarked frequency coefficient f'[i] in the following way.

$$s[X][Y] \leftarrow \left\lfloor \frac{f'[i]}{q[i]} + \frac{1}{2} \right\rfloor \mod 2$$

Here, $X = \left\lfloor \frac{i}{t} \right\rfloor$ and $Y = i \mod t$.

According to the above-mentioned third and fourth embodiment, the watermark embedding strength can be changed according to the frequency band. Specifically, the watermark embedding and reading method applicable for a manipulation method becomes possible. In the method, according to the amount of change of digital data contents from original data for each frequency band due to manipulation such as non-reversible compression, the watermark strength is raised to a band when the amount is large, and the watermark strength is reduced when the amount is small. Accordingly, both of the quality of watermarked digital data contents and the durability of digital watermark data can be improved at a time.

Fifth Embodiment

In the following, a fifth embodiment of the present invention will be described. According to the fifth embodiment, a number of digital data contents (images, sounds and the like) are prepared and calculation of a watermark strength matrix is carried out for each frequency band.

A processing flow of the fifth embodiment is the same as that shown in FIG. 13 basically. Here, the orthogonal transform process shown in FIG. 13 is the same as an orthogonal transform process used for digital watermarking process. For example, if the orthogonal transform used for digital watermarking is discrete cosine transformation (DCT) for a 16×16 size, the DCT is used, and, if the transformation used for digital watermarking is fast Fourier transform (FFT) for an 128×128 size, the FFT is used.

Figure 16:
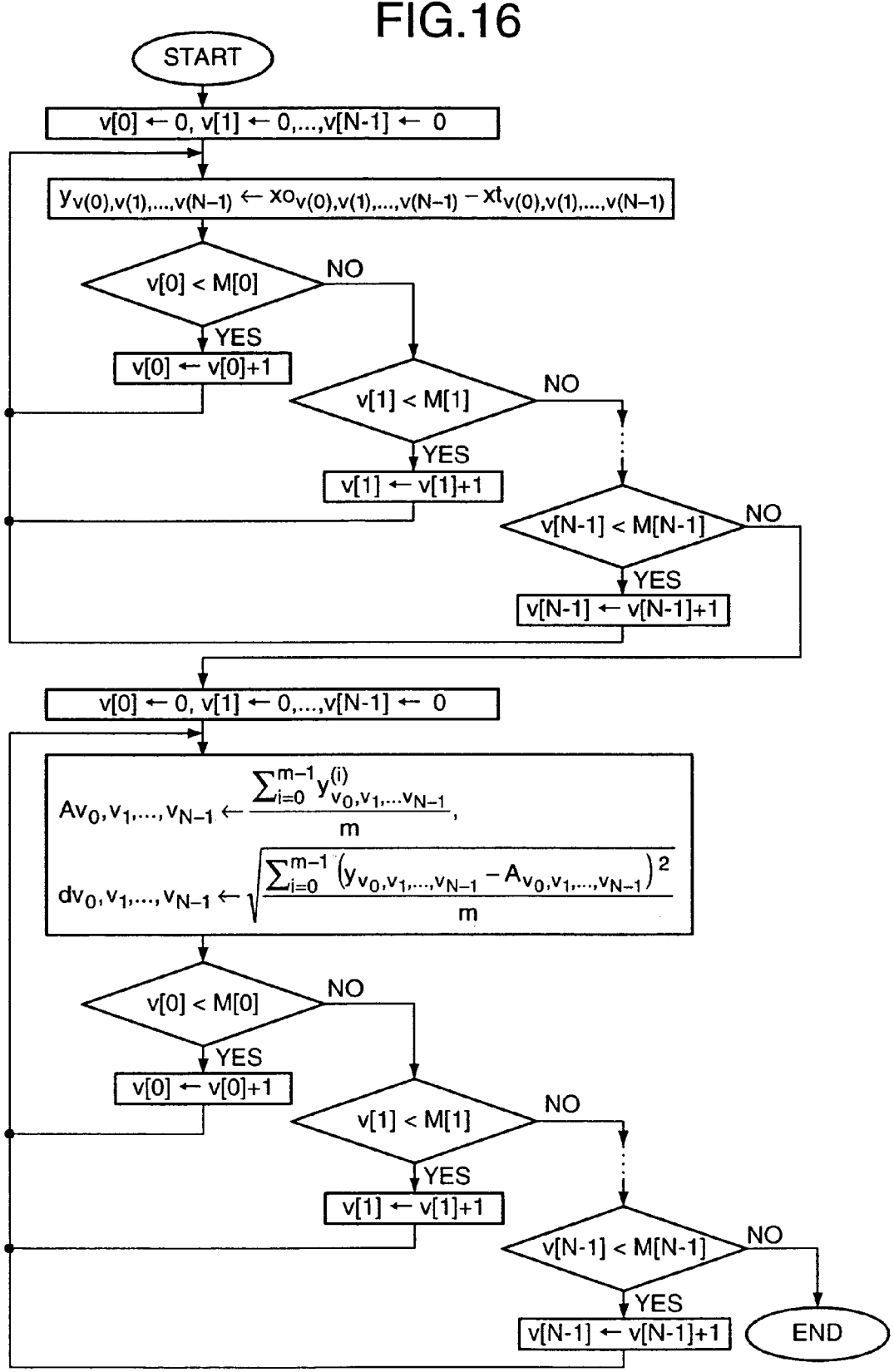
FIG. 16 is a flowchart showing a process of calculating a watermark strength matrix according to a fifth embodiment of the present invention.

FIG. 16 is a flowchart showing the process of calculating the watermark strength matrix for each frequency band according to the fifth embodiment.

Here, let the frequency coefficient matrices be N, the size be $M_0 \times M_1 \ldots \times M_{N-1}$, and each of the components be $x0_{v0,v1,\ldots,vN-1}$, $xt_{v0,v1,\ldots,vN-1}$ ($0 \leq v_u < M_u$, $0 \leq u < N$). The process shown in FIG. 16 is as follows.

1. For all i ($0 \leq i < m$), the following steps 2 and 3 are performed.

2. For all $(v_0, v_1, \ldots, v_{N-1}) = (0, 0, \ldots, 0) \sim (M_0, M_1, \ldots, M_{N-1})$, the process of the following step 3 is performed.

3. $y^{(i)}_{v_0,v_1,\ldots,v_{N-1}} \leftarrow x o_{v_0,v_1,\ldots,v_{N-1}} - x t_{v_0,v_1,\ldots,v_{N-1}}$ 4. For all $(v_0, v_1, \ldots, v_{N-1}) = (0, 0, \ldots, 0) \sim (M_0, M_1, \ldots, M_{N-1})$, the following steps 5 and 6 are performed.

5. $A_{v_0, v_1, \ldots, v_{N-1}} \leftarrow \dfrac{\sum_{i=0}^{m-1} y_{v_0, v_1, \ldots, v_{N-1}}^{(i)}}{m}$ 6. $d_{v_0, v_1, \ldots, v_{N-1}} \leftarrow \sqrt{\dfrac{\sum_{i=0}^{m-1} (y_{v_0, v_1, \ldots, v_{N-1}}^{(i)} - A_{v_0, v_1, \ldots, v_{N-1}})^2}{m}}$ According to the fifth embodiment, it becomes possible to set the watermark strength to a level that is suitable for each frequency band according to a manipulation method for digital data contents such as non-reversible compression. For example, if the watermark strength is Power and the distribution of the amount of change of each coefficient value of the frequency coefficients after a manipulation can be approximated by a Laplacian distribution, when digital watermark data is read from digital data contents on which an assumed manipulation is performed, the rate of bit reversal for the extracted digital watermark data can be made constant $$e^{-\frac{Power}{\sqrt{2}}}$$

regardless of the frequency band (e is the natural logarithm). It is the advantage of the present invention to be able to predict the rate of bit reversal with the constant formula. In addition, according to the embodiment of the present invention, one of the problem of the conventional method that durability of embedded digital watermark data is varied according to the position of the frequency coefficient is solved. That is, the durability of the embedded digital watermark data is constant regardless of the position of the frequency coefficient (which is obvious from the above formula). The embodiment can be applied not only to the watermarking method based on quantization but also to a watermarking method based on the spread spectrum technique.

Sixth Embodiment

In the following, a sixth embodiment of the present invention will be described. According to the sixth embodiment, the digital watermark embedding process is carried out by utilizing the first embodiment and the third embodiment in combination. The watermark embedding process of the sixth embodiment will be described as a modification of the step 150 shown in FIG. 9.

According to the sixth embodiment, the process for embedding digital watermark data in a frequency coefficient sequence $\{f[i]\}$ is as follows.

1. For all $i \left(0 \leq i < \left\lfloor \dfrac{m}{n} \right\rfloor \cdot n\right)$, the following is performed.

2. A quantization width $q[i]$ used when embedding digital watermark data into the frequency coefficient f[i] is obtained by $q[i] \leftarrow dv_0, v_1, \ldots, v_{N-1} \times$ Power by using an element $dv_0, v_1, \ldots, v_{N-1}$ of the watermark weight ratio sequence which corresponds to the band of the frequency coefficient f[i].

3. The watermarked coefficient f'[i] is obtained from the frequency coefficient f[i] in the following way.

i) If $\left\lfloor \dfrac{f[i]}{q[i]} + \dfrac{1}{2} \right\rfloor$ mod 2 is equal to $s[X][Y]$, $f'[i] \leftarrow f[i] + \left(\left\lfloor \dfrac{f[i]}{q[i]} + \dfrac{1}{2} \right\rfloor \times q[i] - f[i]\right) \times e[i]$.

ii) If $\left\lfloor \dfrac{f[i]}{q[i]} + \dfrac{1}{2} \right\rfloor$ mod 2 is not equal to $s[X][Y]$ and $\left\lfloor \dfrac{f[i]}{q[i]} + \dfrac{1}{2} \right\rfloor$ is equal to $\left\lfloor \dfrac{f[i]}{q[i]} \right\rfloor$, $f'[i] \leftarrow \left(\left\lfloor \dfrac{f[i]}{q[i]} + \dfrac{1}{2} \right\rfloor + \dfrac{e[i]+1}{2}\right) \times q[i]$.

iii) If $\left\lfloor \dfrac{f[i]}{q[i]} + \dfrac{1}{2} \right\rfloor$ mod 2 is not equal to $s[X][Y]$ and $\left\lfloor \dfrac{f[i]}{q[i]} + \dfrac{1}{2} \right\rfloor$ is not equal to $\left\lfloor \dfrac{f[i]}{q[i]} \right\rfloor$.

$f'[i] \leftarrow \left(\left\lfloor \dfrac{f[i]}{q[i]} + \dfrac{1}{2} \right\rfloor - \dfrac{e[i]+1}{2}\right) \times q[i]$.

Here, X=i/t, Y=i mod t, and $\lfloor x \rfloor$ is the maximum integer which does not exceed x, and x mod y represents the remainder of x divided by y.

According to the sixth embodiment, both of the quality of the watermarked digital data contents and the durability of digital watermark data can be further improved as compared with the first embodiment and the third embodiment applied separately. The watermark reading method shown in the fourth embodiment can be used as-is for a watermark reading method in the sixth embodiment.

Figure 17:
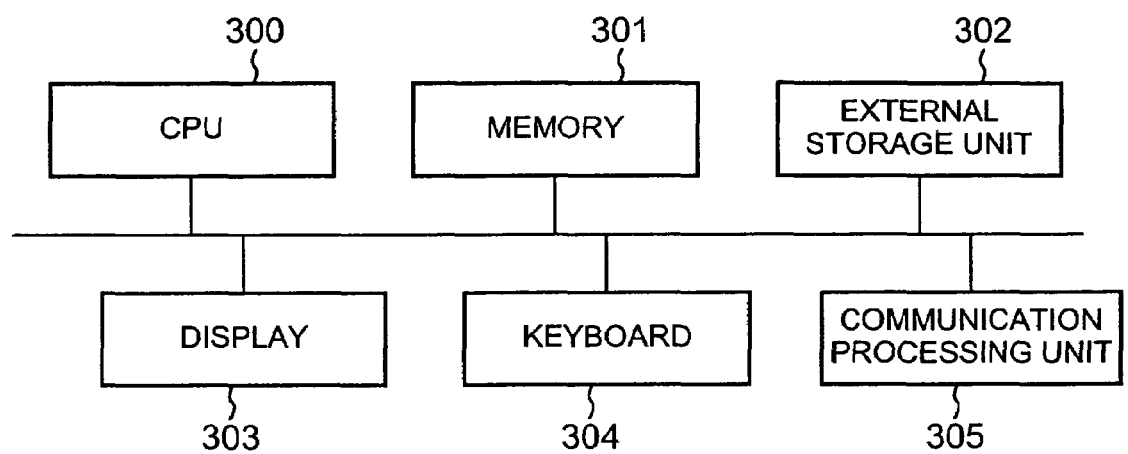
FIG. 17 is a block diagram of a computer.

The above-mentioned processes performed by the digital watermark reading apparatus and the digital watermark embedding apparatus according to the present invention can be constructed by a program which can be stored in a computer readable medium such as a disk unit, a floppy disk, CD-ROM and the like. Then, by installing the program into a computer from the medium, the present invention can be easily realized. FIG. 17 is a diagram showing the configuration example of the computer. As shown in the figure, the computer includes a CPU 300, a memory 301, an external storage unit 302, a display 303, a keyboard 304 and a communication processing unit 305. The digital watermarking process of the present invention is carried out by running the program stored in the memory 301 on the CPU 300.

Figure 18:
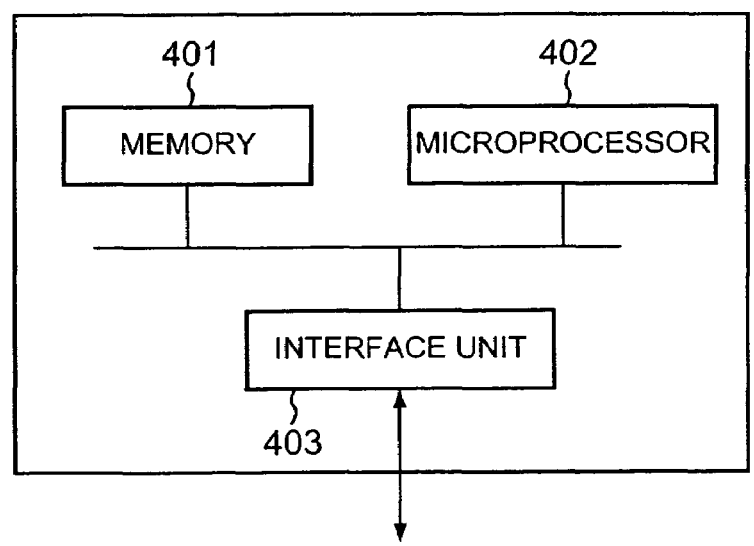
FIG. 18 is a block diagram of an integrated circuit.

In addition, the digital watermark reading apparatus and the digital watermark embedding apparatus can be realized also by an integrated circuit shown in FIG. 18. The integrated circuit includes a memory part 401, a micro processor part 402, an interface part 403 managing an interface to an outside part. Since, the configuration in FIG. 18 shows principal parts, the integrated circuit may includes other parts. The program stored in the memory part 401 is carried out by a micro processor part 402. The integrated circuit can take various other configurations. The integrated circuit can be incorporated to various apparatuses such as a camera so that the apparatuses can perform the digital watermarking process of the present invention.

As mentioned above, according to the present invention, the rate of the amount of change of frequency coefficients is changed, and/or, the amount of change of rate is increased or decreased according to the complexity of the digital data contents. Therefore, the quality of the watermarked digital data contents can be improved and the durability of digital watermark data against a manipulation of the watermarked digital data contents can be improved.

Next, embodiments of the present invention corresponding to the second objectives will be described.

Seventh Embodiment

In the following, the seventh embodiment of the present invention will be described with reference to figures.

Figure 19:
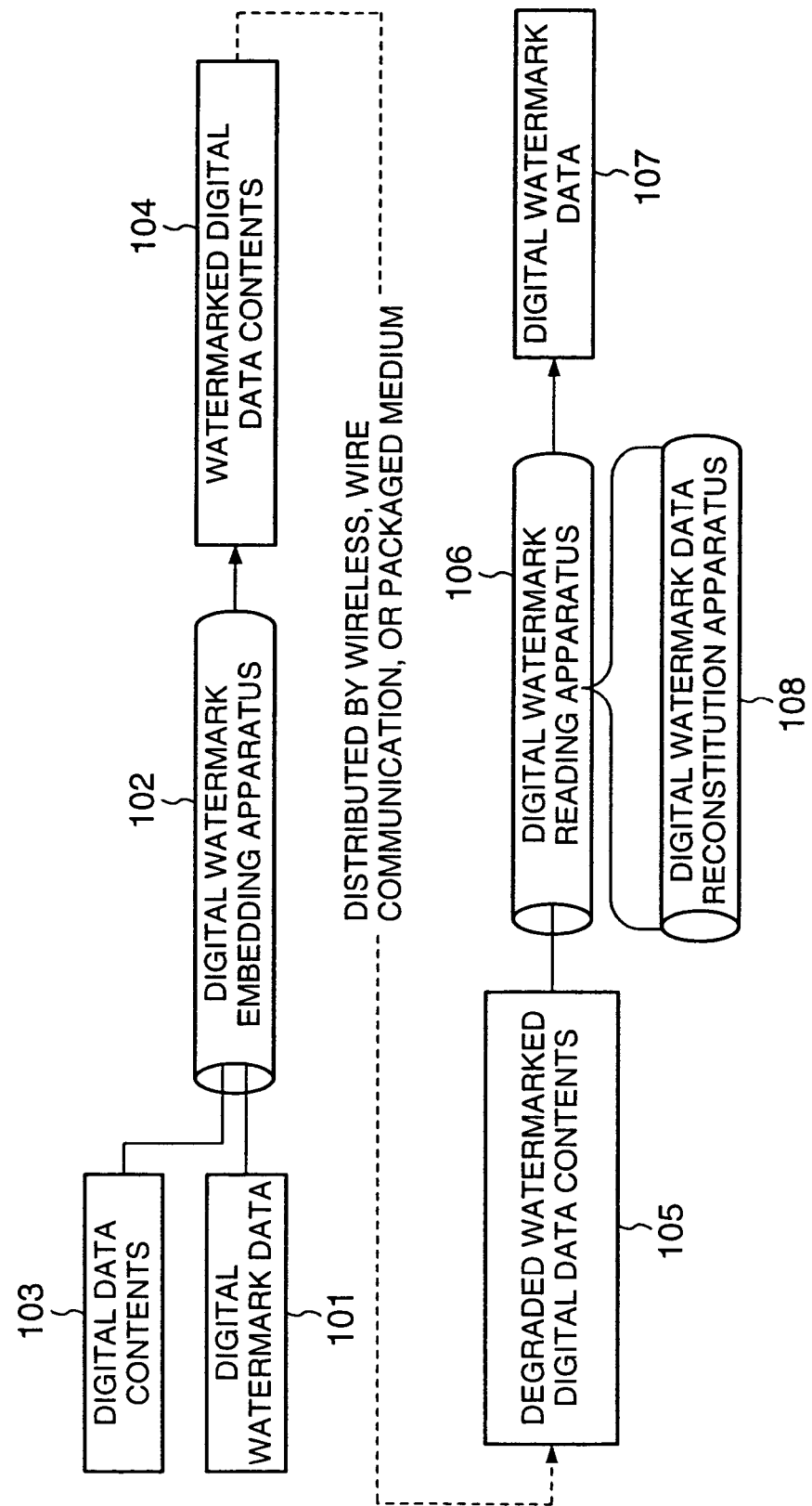
FIG. 19 is a block diagram of a digital watermarking system of the present invention.

FIG. 19 is a block diagram of a digital watermarking system to which the present invention relates. FIG. 19 shows a similar configuration to that shown in FIG. 1. The difference is that FIG. 19 shows a digital watermark data reconstitution apparatus 108 which is an essential part of the present invention. The digital watermark data reconstitution apparatus 108 is provided in the watermark embedding apparatus 106. In the system, a digital watermark data sequence is read from the watermarked digital data contents 105 by using the watermark reading apparatus 106. Then, the digital watermark data sequence is processed in the digital watermark data reconstitution apparatus 108 so that the read digital watermark data 107 is obtained.

In the following, the process for reconstituting the digital watermark data is described in detail.

Figure 20:
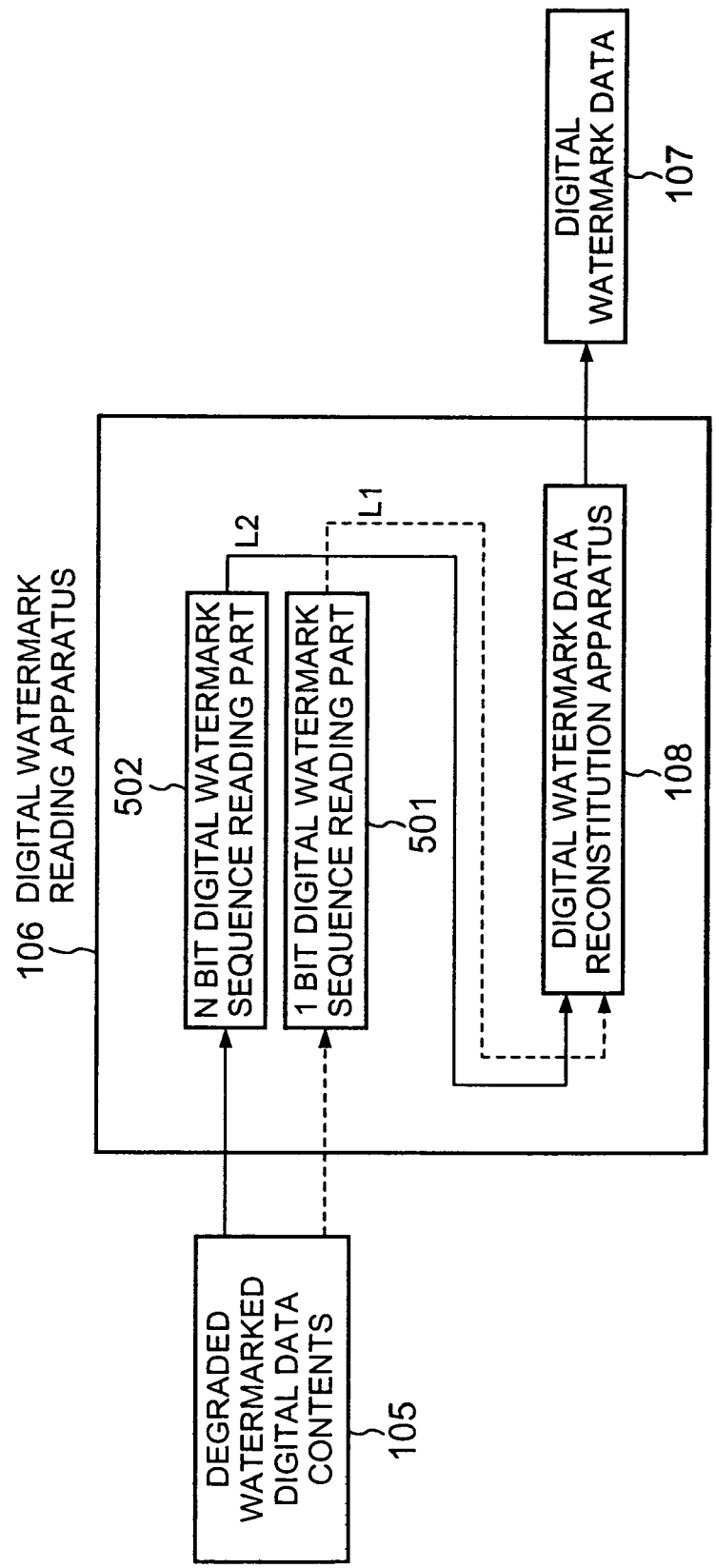
FIG. 20 is a block diagram of a digital watermark reading apparatus shown in FIG. 19.

FIG. 20 is a block diagram of the watermark reading apparatus 106. The digital watermark data reconstitution apparatus 108 provided in the watermark reading apparatus 106 obtains the probability q that bit 1 is read when any 1 bit watermark sequence is read from a whole watermark area beforehand by using the watermark reading apparatus 106.

Specifically, assuming a 1 bit watermark sequence reading part 501, the part 501 reads the watermark sequence 1 bit by 1 bit from all elements of the whole watermark area (a broken line L1), and calculates the ratio of the number of bit 1 to the number of all trials.

In the embodiment, the reading probability of bit 1 and the number of bit 1 are obtained. However, it is possible that the reading probability of bit 0 and the number of bit 0 are obtained. Basically, there is no difference between the former and the latter. The difference is only on implementation.

Accordingly, the probabilities of detecting bit 0 and 1 when reading 1 bit at random in the watermark area by using the digital watermarking algorithm is calculated to be 1-q and q respectively.

The n bit watermark sequence reading part 502 reads the digital watermark data sequence from the watermarked digital data contents for the number of total times of embedding digital watermark data.

Here, digital watermark data is defined as $b_0, b_1, \ldots, b_{m-1}$, $b_i \in \{0, 1\}$, i<m (m bit length), the repeating number of embedding ith bit of the digital watermark data in the digital data contents is defined as $n_i$, the read watermark sequence is defined as $$b'_{0,0}, b'_{0,1}, \ldots b'_{0,n0-1}, b'_{1,0}, b'_{1,1}, \ldots b'_{1,n1-1}, \ldots, b'_{m-1,0},$$
$$b'_{m-1,1}, \ldots b'_{m-1,nm-1-1} \quad b_{i,j} \in \{0, 1\} \left( \sum_{r=0}^{m-1} n_r \text{ bit length} \right).$$

The data reconstitution apparatus 108 receives a subsequence of the digital watermark data sequence one after another from a subsequence corresponding to 0th digital watermark data to a subsequence corresponding to (m-1)th digital watermark data (a solid line L2).

Next, the method for reconstituting ith bit of the digital watermark data will be described concretely.

When $n_i$ bits of digital watermark data sequence is read at random from the watermark area, the probability P(x=k) of k '1' bits appearing in the $n_i$ bit sequence is represented by the binary distribution density function $$P(x=k) = {}_{n_i}C_k q^k \cdot (1-q)^{n_i-k} \quad (1)$$

and the distribution function of that, F(x), is $$F(x) = \sum_{k=0}^{x} {}_{n_i}C_k q^k \cdot (1-q)^{n_i-k} \quad (0 \leq x \leq n_i). \quad (2)$$

Here, ${}_{n_i}C_k$ is the number of combinations when selecting k out of $n_i$.

Setting a reliability threshold value $\alpha$ ($\frac{1}{2} < \alpha \leq 1$) of the digital watermark data, the number of bit 1 included in a subsequence $b'_{i,0}, b'_{i,1}, \ldots b'_{i,ni-1}$ corresponding to ith digital watermark data is calculated by $$k_i = \sum_{r=0}^{ni-1} b'_{i,r}.$$

Then, digital watermark data is determined in the following way by using the formula (2):

$$b_i = \begin{cases} 0 & \text{when } 0 \leq F(k_i) \leq 1-\alpha \\ 1 & \text{when } \alpha \leq F(k_i) \leq 1 \\ \text{unknown or} & \text{when } 1-\alpha < F(k_i) < \alpha \\ \text{not present} & \end{cases} \quad (3)$$

Figure 21:
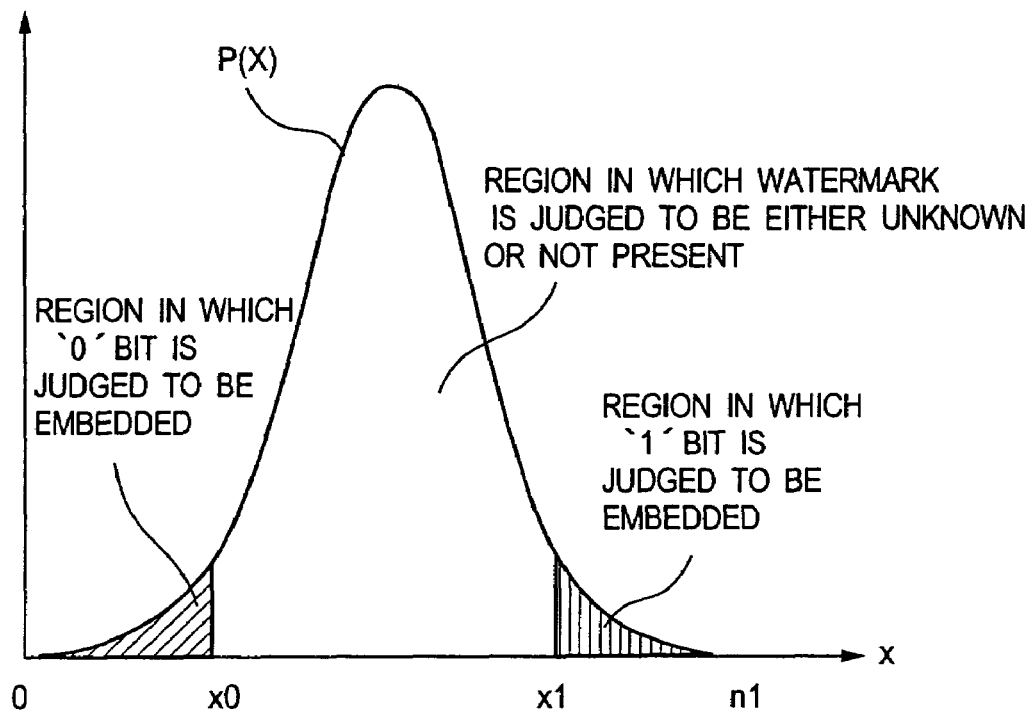
FIG. 21 is a diagram for explaining judgment on digital watermark data.

Viewing from a different angle, when determining by the number of bit 1 included in the watermark sequence $n_i$, if the largest integer $x_0$ that satisfies $0 \leq F(x=x_0) \leq 1-\alpha$ and the smallest integer $x_1$ that satisfies $\alpha \leq F(x=x_1) \leq 1$ are assumed to be threshold values, the digital watermark data is judged as shown in FIG. 21 such that if the number of 1 in $n_i$ is equal to or smaller than $x_0$, the digital watermark data is 0, and that if the number of 1 is equal to or larger than $x_1$, the digital watermark data is 1.

The horizontal axis of FIG. 21 represents the number of bit 1 included in the watermark sequence, and the vertical axis represents frequency of the corresponding number. As for unwatermarked digital data contents, the frequency that bit 1 appears in a bit sequence read at random from the digital data contents becomes binary distribution. Thus, the peak of the frequency is at the half point of the number of bits. On the other hand, as for watermarked contents, in the subsequence $n_i$ in which bit 0 is embedded as digital watermark data, the frequency of bit 1 is 0 if there is no degradation and it is a small number which is equal to or smaller than $x_0$ even if there is degradation. In the subsequence $n_i$ in which bit 1 is embedded as digital watermark data, the frequency of bit 1 is n1 if there is no degradation and it is a large number which is equal to or larger than $x_1$ even if there is degradation. In this way, the distribution of the frequency of bit 1 or bit 0 in the watermarked sequence is leaning to one side from the center of the binary distribution. The present invention uses the lean for reconstituting digital watermark data from the read watermark sequence.

Depending on a watermarking system, a following method can be used. That is, reconstituted digital watermark data is obtained by using the bias from the central value of the distribution P(x) of the watermark sequence extracted from digital data contents 105. Next, the probability of appearing the read watermark sequence is calculated by the formula (2). Then, if the reconstituted digital watermark data is 1, $F(k_i)$ can be added to watermark dada as the reliability, and, if the reconstituted digital watermark data is 0, $1-F(k_i)$ can be added. The reliability $F(k_i)$ and $1-F(k_i)$ of the digital watermark data is obtained from the bias of appearance probability of the digital watermark data in the binary distribution of appearance probability of each bit of 1 bit sequence extracted at random from digital data contents.

Figure 22:
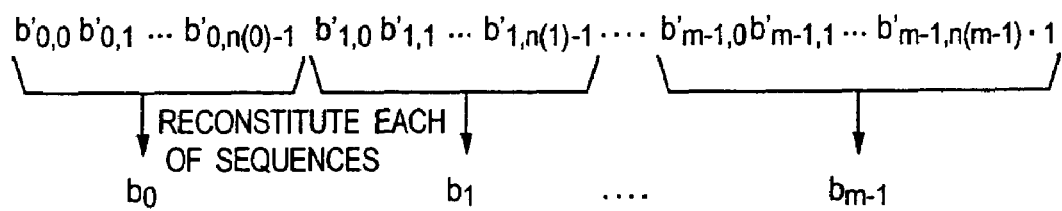
FIG. 22 is a conceptual diagram of reconstituting digital watermark data.

FIG. 22 shows a concept in which the length of the digital watermark data is extended to m bits.

The digital watermark data reconstitution apparatus 108 outputs the reconstituted digital watermark data $b_0, b_1, \ldots, b_{m-1}$ as read digital watermark data 107.

Figure 23:
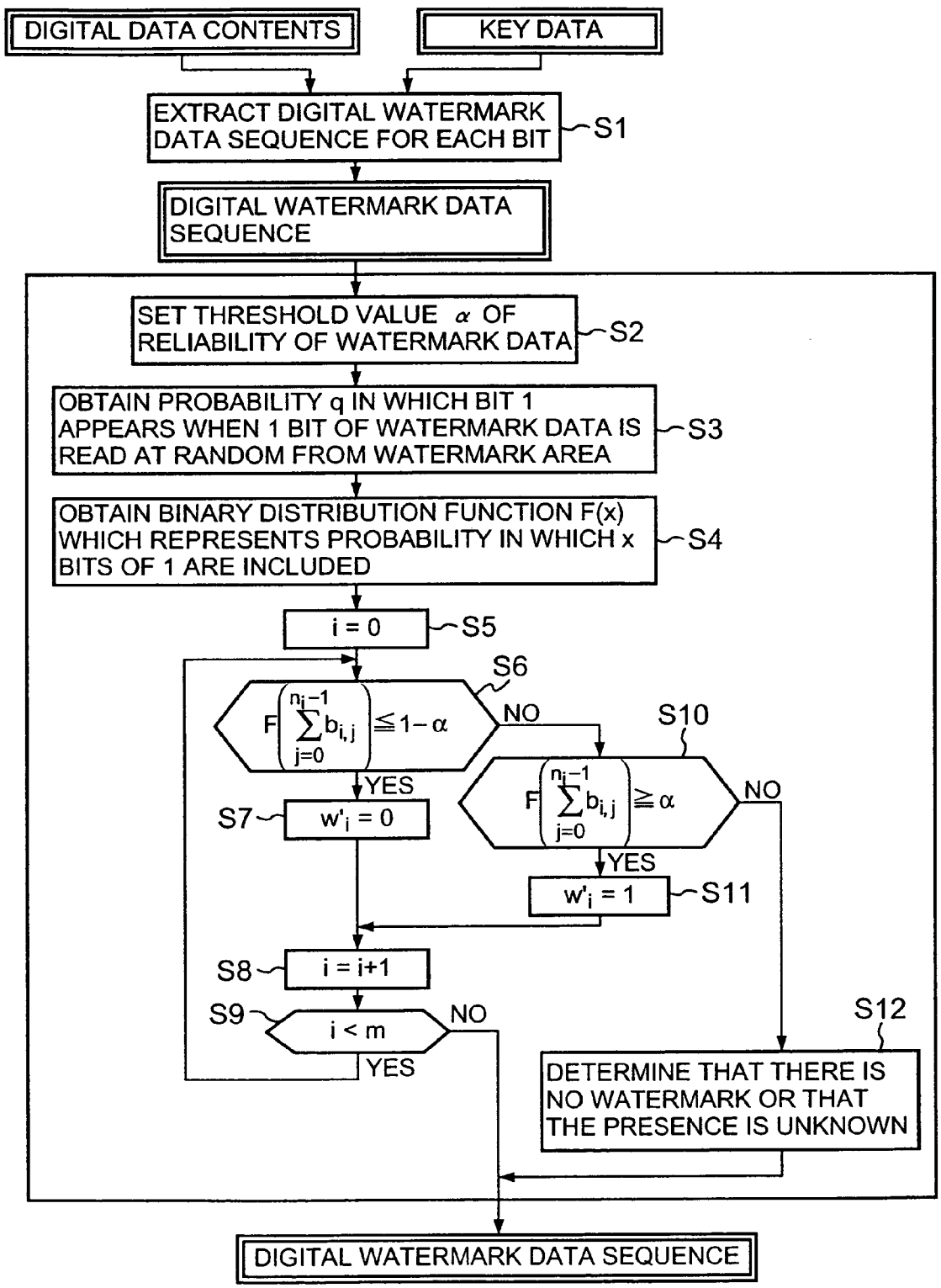
FIG. 23 is a flowchart of a digital watermark reading process according to a seventh embodiment of the present invention.

FIG. 23 is a flowchart showing the above-mentioned process. The process will be described in the following with reference to FIG. 23.

Watermarked digital data contents 105 and key data which is necessary for reading digital watermark data is input, and a digital watermark data sequence is extracted with respect to each bit value in step 1. Then, a threshold value $\alpha$ of the reliability is set in step 2, and a probability q that bit 1 appears when 1 bit of digital watermark data is read at random from the whole watermark area is obtained in step 3. Then, a binary distribution function F(x) which represents probability that x bits of 1 are included in the bit sequence is obtained from the probability q and the repeating number $n_i$ of each bit of digital watermark data in step 4.

Then, 0 is assigned to i which distinguish a subsequence of the digital watermark data sequence in step 5. Next, the number of bit 1 in the subsequence is obtained as $$k_i = \sum_{r=0}^{ni-1} b'_{i,r}$$

and the appearance probability $F(k_i)$ is obtained, then it is determined whether $F(k_i)$ is equal to or less than $1-\alpha$ in step 6. If $F(k_i) \leq 1-\alpha$, the digital watermark data $w'_i$ is reconstituted as 0 in step 7. Then, i is incremented by 1 in step 8, and the process goes back to step 6 if i<m in step 9. If $F(k_i) \leq 1-\alpha$ is not true in step 6, it is checked whether $F(k_i) \geq \alpha$ is true in step 10. If $F(k_i) \geq \alpha$, the digital watermark data $w_i$ is reconstituted as 1 in step 11, and the process goes to step 8. If $F(k_i) \geq \alpha$ is not true in step 10, the process ends by determining as there is no watermark or the presence or absence is unknown in step 12. If i is more than $n_i$ in step 9, a reconstituted watermark sequence $\{w'_i\}$ is output. In the above process, the reading process in step 1 can be carried out between step 4 and step 5. In step 6, it is checked whether $1-F(k_i)$ is more than $\alpha$.

In the seventh embodiment, it is assumed that there is no bias in the distribution represented by formula (1), that is, $q \cong 1/2$.

When the embedding number ni of each bit of digital watermark data is adequate for obtaining a statistical characteristic, it becomes $q \cong 1/2$ generally. However, since the value of q depends on characteristics of an watermarking algorithm and digital data contents, q may take a value deviating largely from $1/2$ in some rare cases. A method for solving this problem will be described in a eighth embodiment.

Eighth Embodiment

Figure 24:
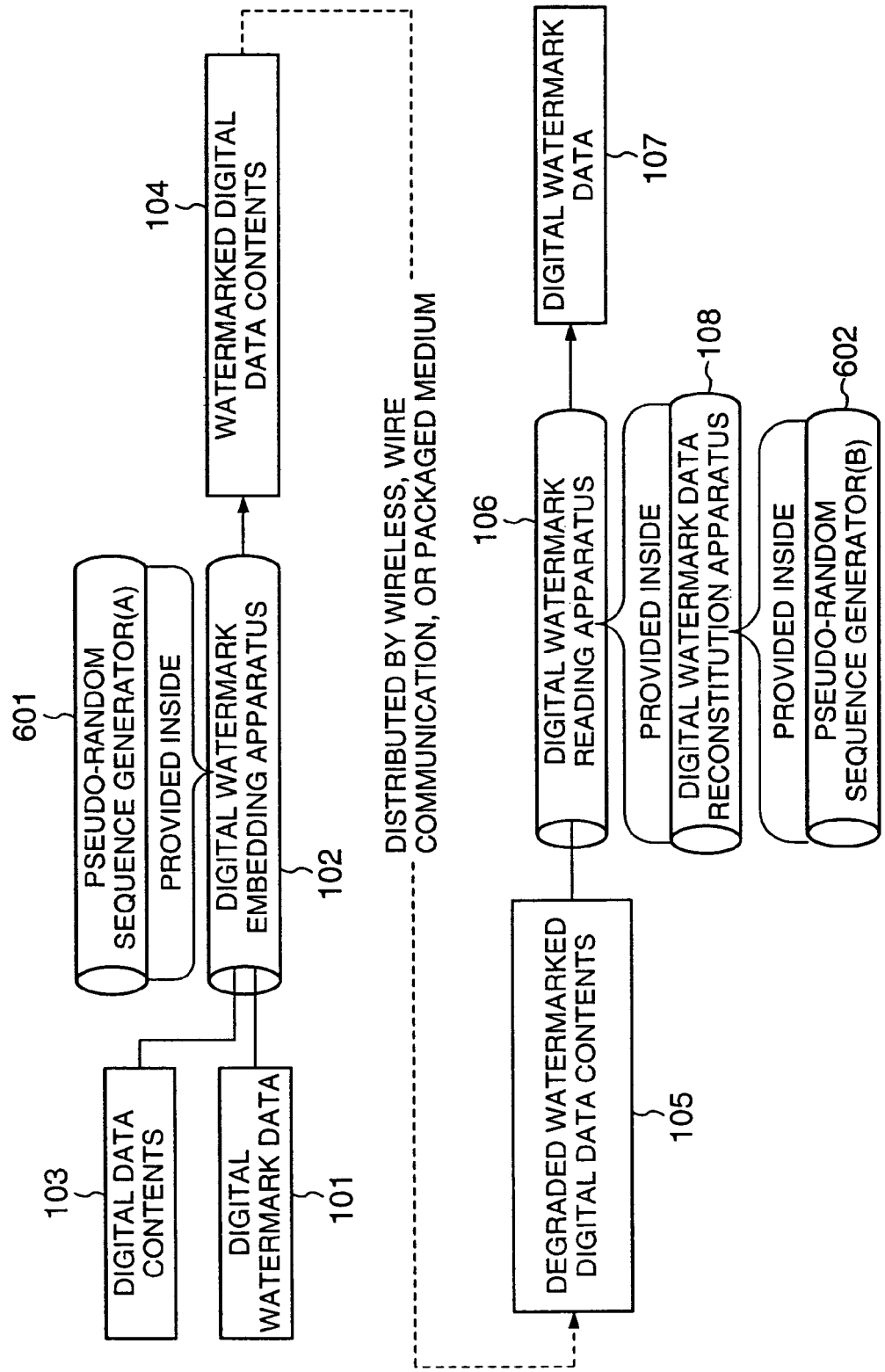
FIG. 24 is a block diagram of a digital watermarking system according to an eighth embodiment of the present invention.

In the following, the eighth embodiment will be described. FIG. 24 is a block diagram of a watermarking system of the ninth embodiment.

The watermark embedding apparatus 102 embeds digital watermark data 101 in digital data contents 103. At the time, when embedding each bit value $n_i$ times repeatedly, watermark sequence is modulated and embedded in the digital data contents 103. The modulation is carried out by a pseudo-random sequence generator (A) 601 which is provided in the watermark embedding apparatus 102.

For example, when assuming the embedding sequence as $b_{0,0}, b_{0,1}, \ldots b_{0,n0-1}, b_{1,0}, b_{1,1}, \ldots b_{1,n1-1}, \ldots, b_{m-1,0}, b_{m-1,1}, \ldots b_{m-1,nm-1-1}$ $b_{i,j} \in \{0, 1\}$, and the pseudo-random sequence as $r_{i,0}, r_{i,1}, \ldots r_{i,ni-1}$ $b_{i,j} \in \{0, 1\}$, the embedding sequence is modulated to $m_{i,0}, m_{i,1}, \ldots m_{i, ni-1}$ $m_{i,j} = b_{i,j}(+)r_{i,j}$ by the pseudo-random sequence. A(+)B represents XOR of A and B.

According to the above-mentioned process, the same pseudo-random sequence is necessary for digital watermark data reading.

For example, if 1 bit watermark sequence is read by using an M-sequence as the pseudo-random sequence, it becomes $q \cong 1/2$. Therefore, the present invention can be applicable without depending on the watermarking algorithm and digital data contents.

When digital watermark data reading, demodulation is carried out as $b'_{i,j} = m_{i,j}(+)r_{i,j}$ by using a pseudo-random sequence generator (B) 602 which is provided in the watermark reading apparatus 106.

Here, the pseudo-random sequence generator (A) 601 and the pseudo-random sequence generator (B) 602 needs to be implemented such that both of the generators generate the same pseudo-random sequence.

Watermark data is reconstituted with the method of the seventh embodiment from the watermark sequence $b'_{0,0}, b'_{0,1}, \ldots b'_{0,n0-1}, b'_{1,0}, b'_{1,1}, \ldots b'_{1,n1-1}, \ldots, b'_{m-1,0}, b'_{m-1,1}, \ldots b'_{m-1,nm-1-1}$ $b_{i,j} \in \{0, 1\}$ obtained by the demodulation.

Since it is considered that the appearance probability q of bit 1 in the watermark sequence can be approximated by the binary distribution regardless of the presence or absence of modulation, there is no influence on the distribution of the density function (1) due to the modulation shown in this embodiment.

In addition, $q=1/2$ can be assumed in implementation, that is, no process is necessary for obtaining q. Therefore, the amount of processing that is required for watermark reconstitution thus becomes the same as that for majority decision processing. Thus, the reconstitution process becomes faster.

Ninth Embodiment

In the following, a ninth embodiment will be described. In the ninth embodiment, an example will be described showing concrete values on the basis of the seventh embodiment and the eighth embodiment. In this embodiment, it is assumed that digital watermark data is 1 bit, the repeating number n of embedding is 127 and the probability q that bit 1 is read when reading 1 bit watermark sequence at random from the whole watermark area is ½. If the threshold value α is 0.99999 (which means 99.999%), $x_0$ in FIG. 21 is 36 and $x_1$ is 90. That is to say, according to the present invention, under the above-mentioned condition, digital watermark data is judged as bit 0 if the number of '1' appeared in the watermark sequence (n bits) is equal to or less than 36, and it is judged as bit 1 if the number of '1' appeared in the watermark sequence (n bits) is equal to or more than 90, and it is judged that there is no watermark data or the presence or absence is unknown in other cases. If it is judged that there is digital watermark data, the correctness of more than 99.999% can be ensured.

Tenth Embodiment

A tenth embodiment will be described in the following. According to the embodiment shown in FIG. 23, as is understood from the above-mentioned procedure, if even the reliability of only 1 bit is not obtained, that is, if $F(k_t)$ or $1-F(k_t)$ is less than α, the reconstitution of the digital watermark data becomes impossible because it is judged that there is no digital watermark data or the presence or absence is unknown. The tenth embodiment solves the problem. In this case, it is assumed that the repeating number of embedding each bit of digital watermark data is the same value n.

The method for reconstituting digital watermark data $w_0$, $w_1, \ldots, w_{m-1}$ from watermark sequence $b'_{0,0}, b'_{0,1}, \ldots b'_{0,n0-1}$, $b'_{1,0}, b'_{1,1}, \ldots, b'_{m,0}, b'_{m,1}, \ldots b'_{m,n-1}$ which is read from digital data contents will be described in the following with reference to FIG. 25.

The watermark sequence is read with respect to each bit value from the digital data contents and key data necessary for digital watermark data reading in step 1.

The threshold value α (½<α≦1) of the reliability is set in step 2. For example, if the reliability of read digital watermark data needs to be equal to or more than 99%, it is set as α=0.99.

The probability q of bit '1' when 1 bit of the watermark sequence is read at random from the whole watermark area of watermarked digital data contents is obtained beforehand in step 3. The appearance probabilities of bits '0' and '1' are calculated as 1-q and q respectively.

The probability that x bits of '1' are included in the watermark sequence of each bit data of digital watermark data are obtained as $$F(x) = \sum_{j=0}^{x} {}_nC_j q^j \cdot (1-q)^{n-j}$$

by using the binary distribution function in step 4.

It is checked in step 5 that the probability that n bit digital watermark data sequence is digital watermark data exceeds the threshold value α. Specifically, it is checked whether the following formula (4) is satisfied.

$$F\left(\frac{\sum_{i=0}^{m-1} \left|\sum_{j=0}^{n-1} b'_{i,j} - \frac{n}{2}\right|}{m} + \frac{n}{2}\right) \geq \alpha \quad (4)$$

Here, |a| represents the absolute value of a.

$$\sum_{j=0}^{n-1} b_{i,j} - \frac{n}{2}$$

represents the bias from the center of the binary distribution of the number of bit '1' in the n bit watermark sequence.

$$\sum_{i=0}^{m-1} \text{ of } \sum_{j=0}^{n-1} b_{i,j} - \frac{n}{2}$$

divided by m represents the average for the m bits of the whole digital watermark data. n/2 represents the center of the binary distribution.

If the formula (4) is true, it is judged that there is digital watermark data. Thus, in each n bit watermark sequence of m digital watermark data sequences, digital watermark data is reconstituted by a majority decision processing.

Specifically, if it is judged that there is digital watermark data, digital watermark data is reconstituted in the following way in step 6.

For all $i$ ($0 \leq i < m$), when $\sum_{j=0}^{n-1} b_{i,j} < \frac{n}{2}$: $w'_i = 0$, when $\sum_{j=0}^{n-1} b_{i,j} \geq \frac{n}{2}$: $w'_i = 1$.

Figure 25:
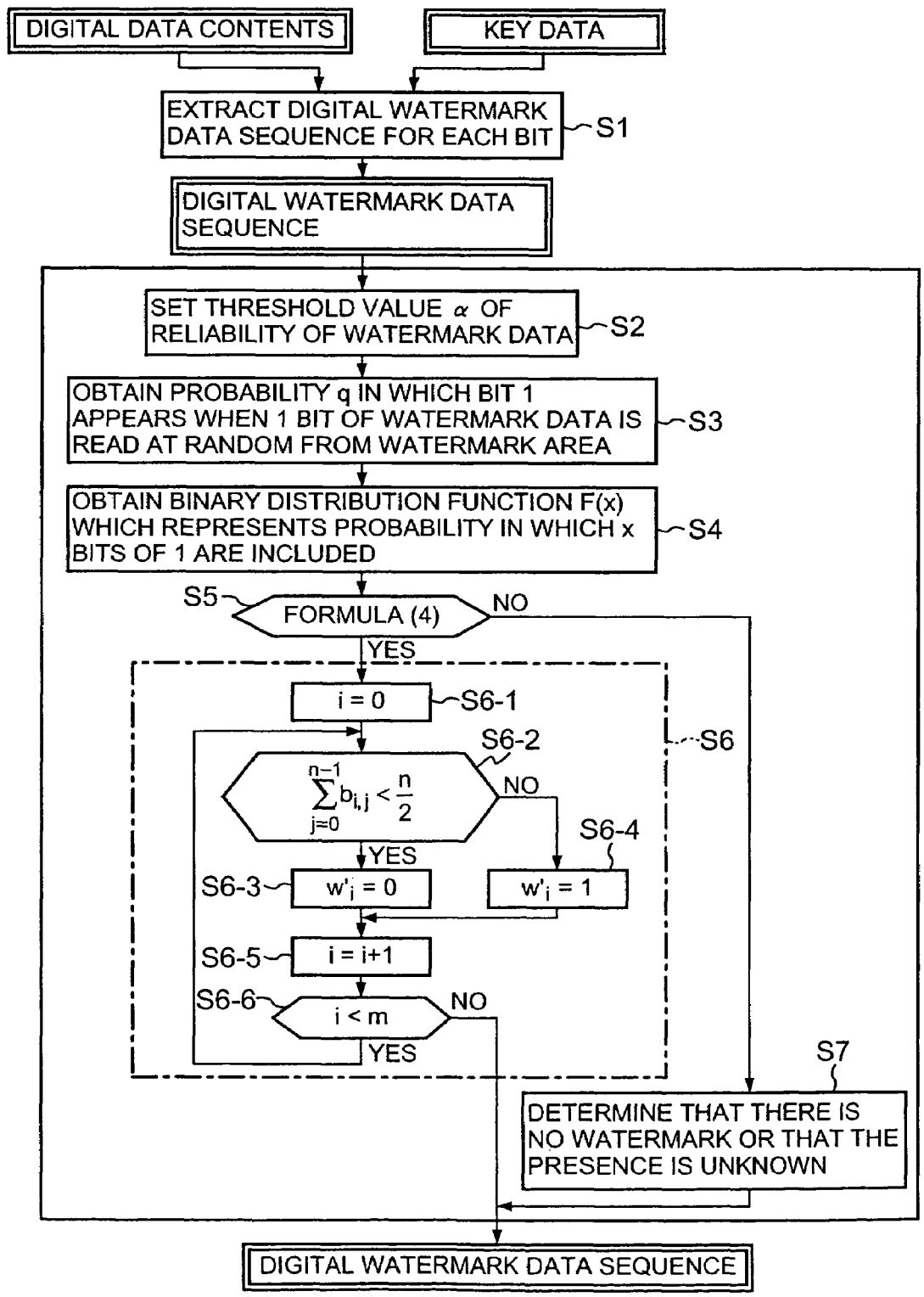
FIG. 25 is a flowchart of a digital watermark reading process according to a tenth embodiment of the present invention.

This process is carried out by steps 6-1-6-7 in FIG. 25.

$$\text{If } F\left(\frac{\sum_{i=0}^{m-1} \left|\sum_{j=0}^{n-1} b_{i,j} - \frac{n}{2}\right|}{m} + \frac{n}{2}\right) < \alpha,$$

it is judged that there is no watermark data or the presence or absence is unknown. A following formula (5) can be used instead of the formula (4).

$$F\left(\frac{n}{2} - \frac{\sum_{i=0}^{m-1} \left|\sum_{j=0}^{n-1} b'_{i,j} - \frac{n}{2}\right|}{m}\right) \leq 1 - \alpha \quad (5)$$

If the formula (5) is not true, it is judged that there is no watermark data or the presence or absence unknown.

According to the tenth embodiment, statistical processing for whole watermark sequence is carried out so as to judge the presence or absence of watermark by using the formula (4) or the formula (5). If it is judged that there is digital watermark data, the reconstitution is carried out by the majority decision processing. Therefore, even if there is one bit of low reliability, digital watermark data can be reconstituted.

In FIG. 25, the step 1 can be carried out between the steps 4 and 5.

Figure 26:
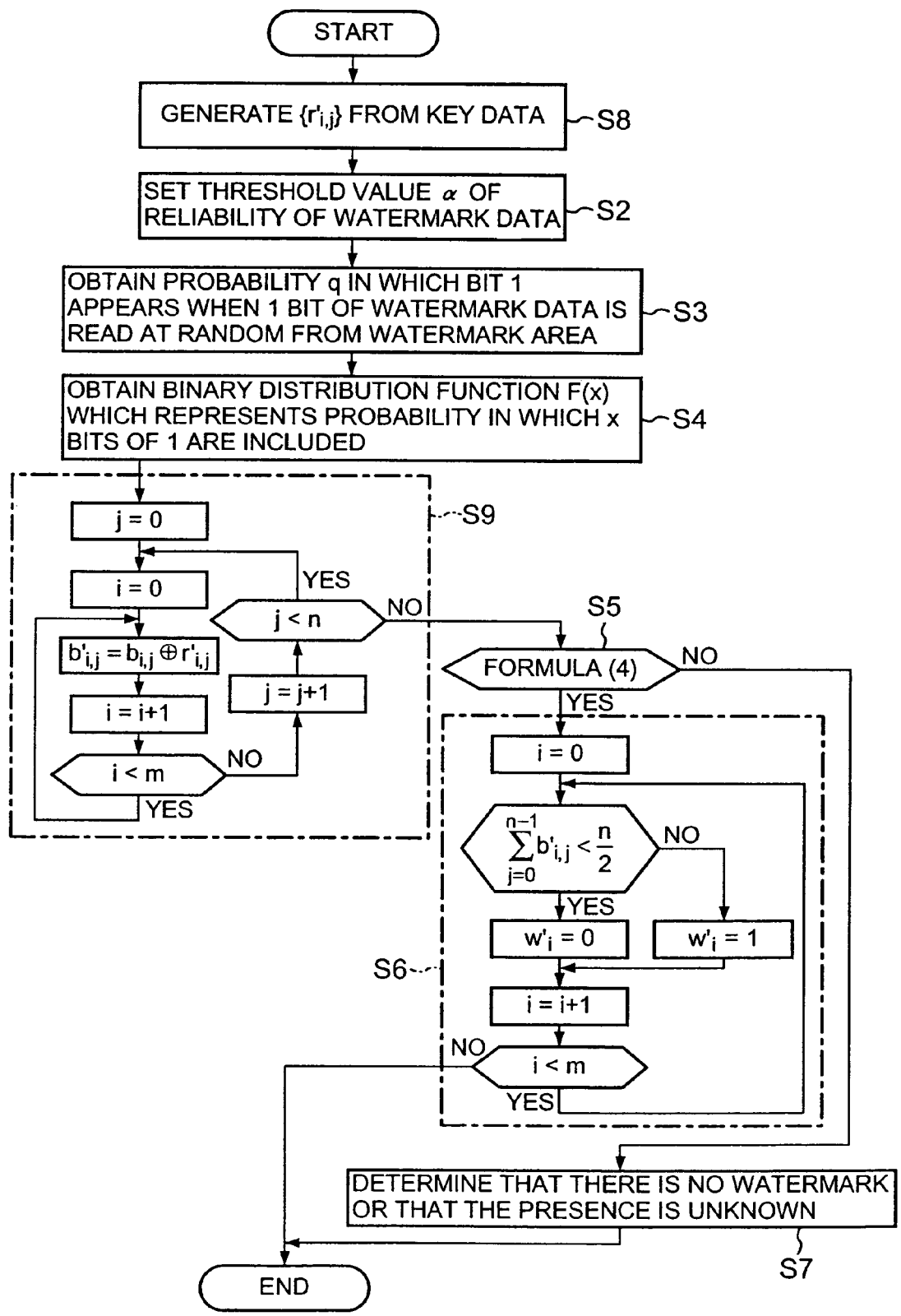
FIG. 26 is a flowchart of a digital watermark reading process according to a tenth embodiment of the present invention when reading digital watermark data sequence which is embedded after being modulated by a pseudo-random sequence.

The tenth embodiment may use the pseudo-random sequence which is described in the eighth embodiment. Specifically, watermark embedding is carried out by modulating digital watermark data sequence with the pseudo-random sequence. When reconstituting, the read digital watermark data sequence is demodulated by the pseudo-random sequence, then the judgment by the formula (4) is performed. If the result is more than α and there is digital watermark data, the reconstitution process of the majority decision is performed on the demodulated sequence, which is the same process as the step 6 of the eleventh embodiment. The whole process is shown in FIG. 26, adding the same reference symbol to the corresponding part shown in FIG. 25. In the example, the pseudo-random sequence $\{r_{i,j}\}$ is generated from key data 'Key' and the process goes to step 2 in step 8. Next to step 4, watermark sequence is demodulated with the pseudo-random sequence $\{r_{i,j}\}$ in step 9. The watermark bit $b'_{i,j}$ in the formula (4) in step 5 is a bit which is demodulated in step 9. Also, the majority decision processing in step 6 is performed on $b'_{i,j}$.

Eleventh Embodiment

In the following, a eleventh embodiment will be described.

Since digital watermark data is dispersed by the pseudo-random sequence, when q is approximated to ½, the presence or the absence of watermark data in the watermark sequence can be judged as follows.

The probability that x bits of '1' (a number x of '1' bits) are included in the n bit watermark sequence which constitutes each bit of digital watermark data is represented as $$F(x) = \sum_{j=0}^{x} {}_nC_j(1/2^n)$$

by using the binary distribution function. Accordingly, by obtaining the smallest integer $x_1$ which satisfies $F(x=x_1) \geq \alpha$, the demodulated sequence of the step 5 in the tenth embodiment can be judged with the following formula (6).

$$\frac{\sum_{i=0}^{m-1} \left|\sum_{j=0}^{n-1} b'_{i,j} - \frac{n}{2}\right|}{m} + \frac{n}{2} \geq x_1 \quad (6)$$

In this case, the amount of processing can be reduced to the same level as that of the majority decision processing.

The judgment is equivalent to a judgment for judging whether the average of the bias from the center n/2 of the binary distribution of the watermark sequence is equal to or more than $x_1$.

If the formula (6) is true and it is judged that there is digital watermark data, the majority decision process is performed on the watermark sequence which is demodulated by the pseudo-random sequence in the following way.

For all $i$ $(0 \leq i < m)$, when $\sum_{j=0}^{n-1} b'_{i,j} < \frac{n}{2}$: $w'_i = 0$, -continued when $\sum_{j=0}^{n-1} b'_{i,j} > \frac{n}{2}$: $w'_i = 1$ Then, the digital watermark data is reconstituted.

If $\frac{\sum_{i=0}^{m-1} \left|\sum_{j=0}^{n-1} b'_{i,j} - \frac{n}{2}\right|}{m} + \frac{n}{2} < x_1$, it is judged that there is no watermark data or the presence or absence is unknown.

In the above process, it is possible to use the maximum integer $X_0$ which satisfies $F(x=x_0) \leq 1-\alpha$ instead of the minimum integer $x_1$ which satisfies $F(x=x_1) \geq \alpha$. In this case, a formula for judging the presence or absence of watermark is shown below as a formula (7).

$$\frac{n}{2} - \frac{\sum_{i=0}^{m-1} \left|\sum_{j=0}^{n-1} b'_{i,j} - \frac{n}{2}\right|}{m} \leq x_0 \quad (7)$$

If the left part of the formula is more than $x_0$, it is judged that there is no watermark data or the presence or absence is unknown.

Twelfth Embodiment

In the following, a twelfth embodiment of the present invention will be described.

When it is judged that there is digital watermark data by the formula (4), the digital watermark data is reconstituted by the above-mentioned majority decision process. At the same time, the reliability of the reconstituted watermark sequence as a whole is calculated as $$F\left(\frac{\sum_{i=0}^{m-1} \left|\sum_{j=0}^{n-1} b'_{i,j} - \frac{n}{2}\right|}{m} + \frac{n}{2}\right)$$

and it is output.

Similarly, when it is judged that there is digital watermark data by the formula (5) and the digital watermark data is reconstituted, the reliability of the reconstituted digital watermark data sequence as a whole is calculated as $$F\left(\frac{n}{2} - \frac{\sum_{i=0}^{m-1} \left|\sum_{j=0}^{n-1} b'_{i,j} - \frac{n}{2}\right|}{m}\right)$$

and it is output.

When it is judged that there is digital watermark data by the formula (6), the digital watermark data is reconstituted by the above-mentioned majority decision process. At the same time, the reliability of the reconstituted watermark sequence as a whole is calculated as $$F\left(\frac{\sum_{i=0}^{m-1}\left|\sum_{j=0}^{n-1}b'_{i,j}-\frac{n}{2}\right|}{m}+\frac{n}{2}\right)$$

and it is output.

Similarly, when it is judged that there is digital watermark data by the formula (7), the reliability of the digital watermark data as a whole is calculated as $$F\left(\frac{n}{2}-\frac{\sum_{i=0}^{m-1}\left|\sum_{j=0}^{n-1}b'_{i,j}-\frac{n}{2}\right|}{m}\right)$$

and it is output.

In the above-mentioned seventh-twelfth embodiments, the reading probability of bit 1 and the number of bit 1 are obtained. However, it is possible that the reading probability of bit 0 and the number of bit 0 are obtained. Basically, there is no difference between the former and the latter. The difference is only on implementation.

In the following, examples of experiments will be shown. In the following experiments, an image of "lena" which has 128×128 pixels is used as a test image, and the threshold value α of the reliability is assumed to be 0.999999.

First Experiment

Figure 27:
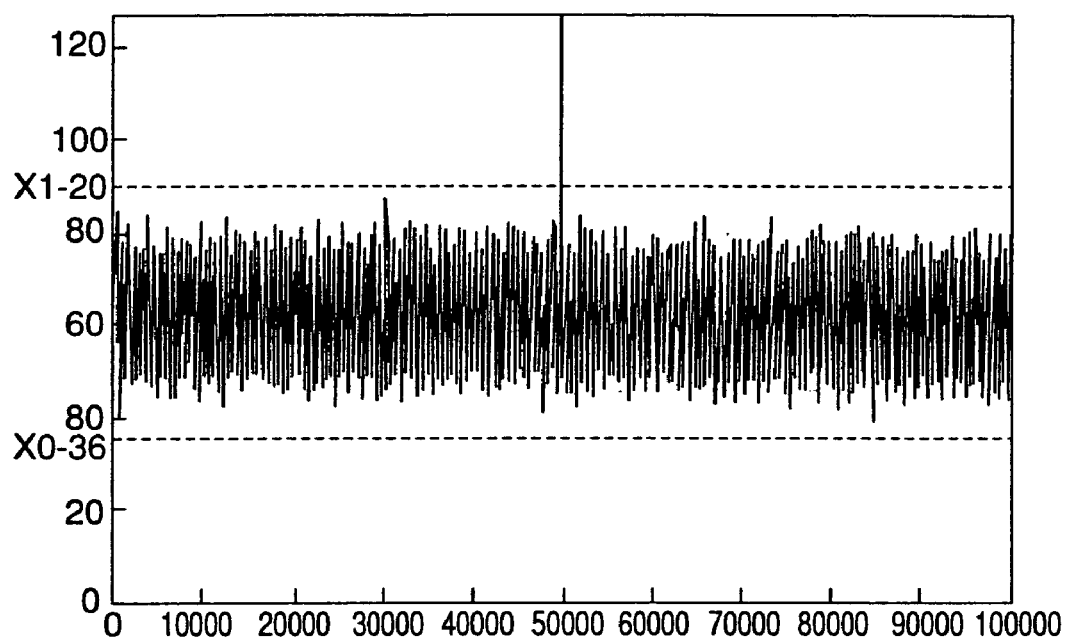
FIG. 27 is a diagram showing the result of reading a digital watermark data sequence without modulation.

In this experiment, 1 bit digital watermark data '1' was embedded 127 times repeatedly using key data '50,000', and the watermark sequence was read with various key data. FIG. 27 shows the number of bit '1' in the read watermark sequence corresponding to the key data. In FIG. 27, the vertical axis shows the number of bit '1' in the read watermark sequence, and the horizontal axis shows the key data value. In this experiment, the appearance frequency of bit '1' in the watermark area A was q=0.492247.

When correct key data (50,000) is used, it is judged that digital watermark data is '1' with 99.9999% correctness since the number of bit '1' is more than the threshold value $x_1$ for judging the presence of watermark. When incorrect key data is used, it is judged that there is no watermark data or the presence or absence is unknown.

Second Experiment

Figure 28:
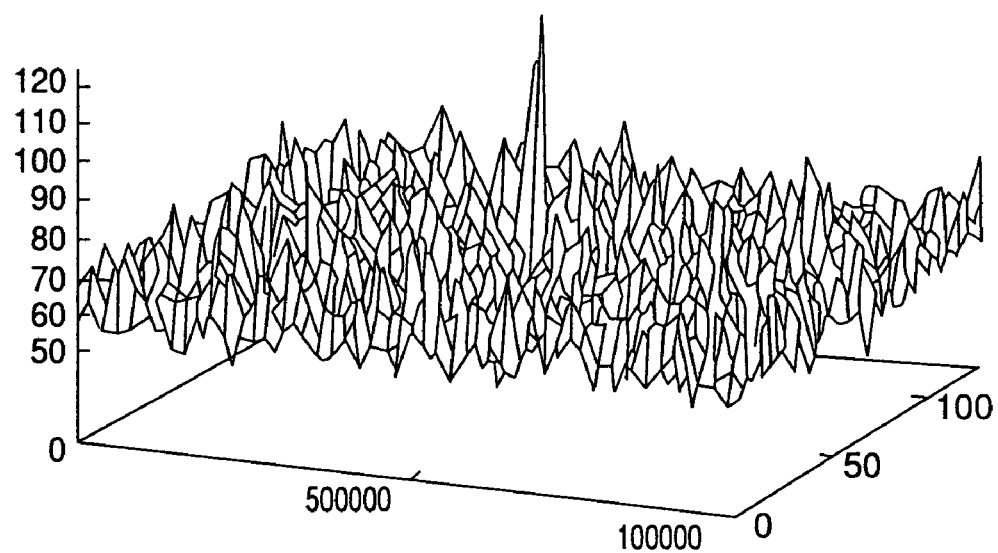
FIG. 28 is a diagram showing the result of reading a modulated digital watermark data sequence.

In the second experiment, a watermark sequence which was modulated with a 7 stage M-sequence (initial state is 64) was embedded, and a similar experiment as the first experiment was carried out with various key data and M-sequences of various initial states. The result is shown in FIG. 28. By carrying out the modulation, the value of q becomes 0.500000 from 0.492247, and the variance becomes 31.718777 from 31.008265. Thus, the values are almost not changed from those of the first experiment. It is only when correct key data and correct pseudo-random sequence are used that digital watermark data can be read. In addition, when the watermark sequence is embedded in half data of the watermark area A, q=0.741547 with the modulation and q=0.499768 without the modulation.

The effects of the present invention corresponding to the second object is as follows.

(1) There are following effects by judging digital watermark data on the basis of the binary distribution in statistics:

The probabilities of following cases can be evaluated quantitatively. The cases are: digital data contents which do not contain digital watermark data are wrongly judged as containing digital watermark data, and incorrect digital watermark data is read from watermarked digital data contents. In addition, the probability can be suppressed within 2(1−α) by using the reliability threshold α of digital watermark data.

(2) There are following effects by modulating digital watermark data by a pseudo-random sequence before embedding the digital watermark data:

The bias of the probability q of reading bit '1' when 1 bit watermark sequence is read at random from the whole watermark area.

It becomes difficult to detect the presence or absence of watermark data and the value from the bias of q without the correct key data and the pseudo-random sequence, the key data being necessary for reading digital watermark data and the pseudo-random sequence being necessary for demodulating read watermark sequence. It can strengthen security which is an important element for the digital watermarking system.

In an implementation, since it can be assumed to be q=½, the amount of processing that is required for watermark reconstitution becomes the same as that for majority decision processing. Thus, the speed of the processing becomes higher.

α is an index which represents a lower limit of the correctness rate of read digital watermark data, and is manageable in the digital watermarking system. Therefor, the method of using α is superior to a conventional method of showing the correctness rate of read digital watermark data to a user.

According to the seventh embodiment, if there is even one bit of low reliability in digital watermark data {w'$_i$}, it is judged that there is no watermark data or the presence or absence is unknown. However, even in the case, according to the eleventh thirteenth embodiments, the reliability of digital watermark data can be evaluated quantitatively, the probability for reading digital watermark data incorrectly can be suppressed within 2(1−α), and the digital watermark data can be reconstituted. In the tenth-twelfth embodiments, the whole digital watermark data is statistically processed by modifying the formula for judging the presence or absence of digital watermark data, since digital watermark data can be reconstituted in many cases, when watermark sequence {b'$_{i,j}$}, (0≦i<m,0j≦n) is seen statistically as a whole.

In addition, according to the seventh embodiment, $$F\left(\sum_{j=0}^{n-1}b'_{i,j}\right)$$

needs to be calculated with the distribution function F(x) of the binary distribution for all i to reconstitute digital watermark data from watermark sequence. On the other hand, according to the tenth-twelfth embodiments, only one calculation using the distribution function is necessary so that the amount of processing can be reduced.

The present invention becomes more effective in combination with an error correction code. That is, when a part of bits in digital watermark data is intensively corrupted, it is judged that only the part of bits is unknown and other bit data is in high correctness rate. Therefore, correct data can be read by correcting only the corrupted bit data.

In the present invention corresponding to the second object, the above-mentioned processes can be constituted by programs which can be stored in a computer readable medium. Therefore, digital watermarking processing of the present invention can be carried out with a computer such as one shown in FIG. 17. Additionally, the watermarking apparatus of the present invention can be realized by an integrated circuit such as one shown in FIG. 18.

In the following, the present invention corresponding to the third object will be described.

Figure 29:
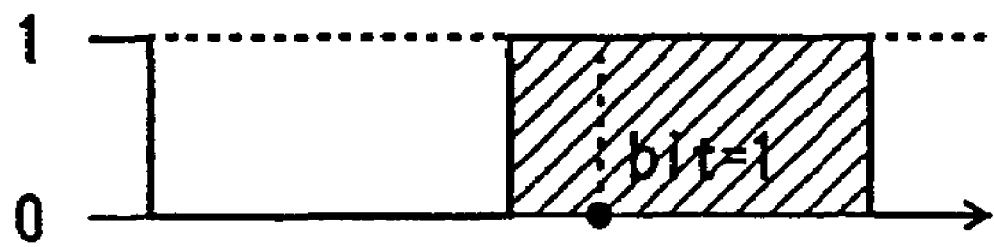
FIG. 29 is a diagram showing a digital watermark reading process according to a conventional technique.

In the first place, the conventional digital watermark reading method will be further described in order to clarify the feature of the present invention corresponding to the first objective. The conventional method is based on hard decisions on binary coding in code theory, which is shown in FIG. 29. With respect to the watermark reading method based on hard decisions on binary coding, if almost all watermarked contents are embedded within a same range (shown as the diagonally shaded area), the performance is enough.

Figure 30:
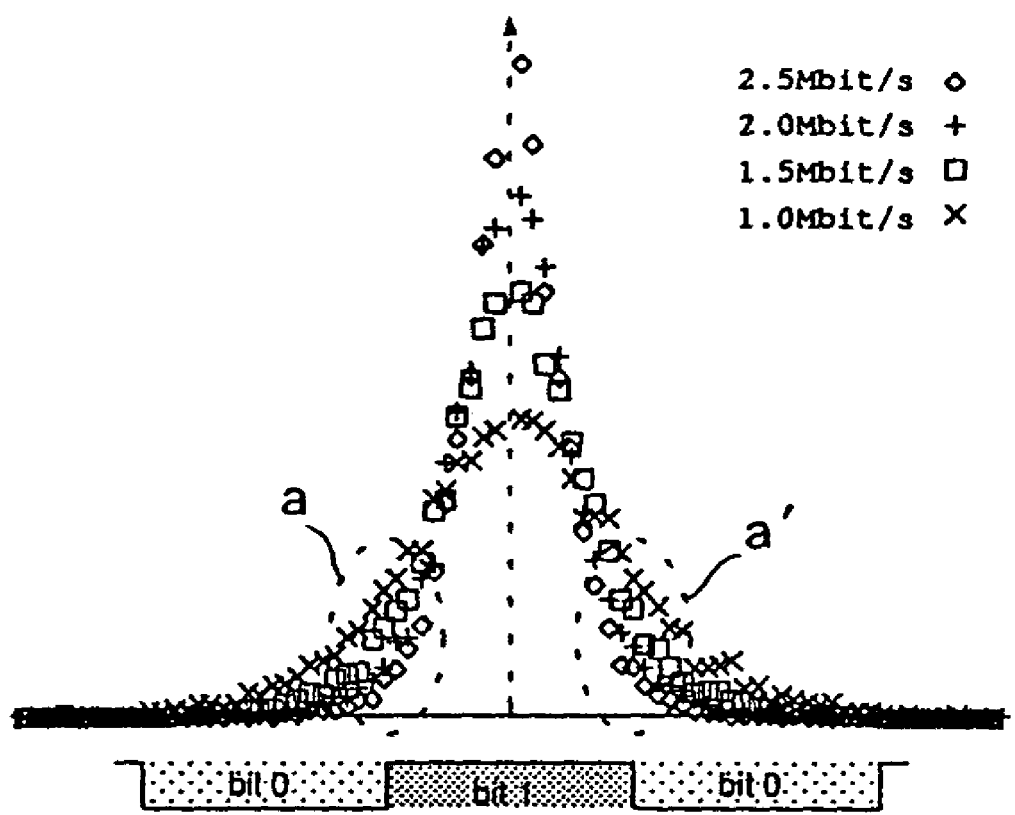
FIG. 30 is a graph showing how MPEG-1 coding changes '1' data bit, specifically the graph shows occurrence frequency with respect to change amount of a DCT coefficient value by 1.5-Mbps MPEG-1 coding.

However, according to the conventional watermark reading method, there is a following problem. FIG. 30 shows a graph showing how MPEG-1 coding changes '1' data bit, specifically the graph shows occurrence frequency with respect to change amount of a DCT coefficient value by 1.5 Mbps MPEG-1 coding. As shown in FIG. 30, there is a case in which a considerable amount of watermarked data appears in the vicinity of the boundary of the reading bit value (which is shown in two dotted circles a and a'). As a result, it becomes difficult to separate noise from the watermarked data. In addition, there is a possibility that a digital watermark data value which is read becomes reversed with respect to the embedded digital watermark data.

In order to avoid the problem, two measures are conceivable. First measure is to raise the data diffusion rate by increasing the number of times the data is embedded. Second measure is to increase the watermark embedding strength. Neither of these measures is a true solution because the first one may reduce the relative amount of embedded data and the second one may degrade the image. Accordingly, the present invention adopts soft decision rather than hard decision. In the following, a general description of the present invention will be given.

Figure 31:
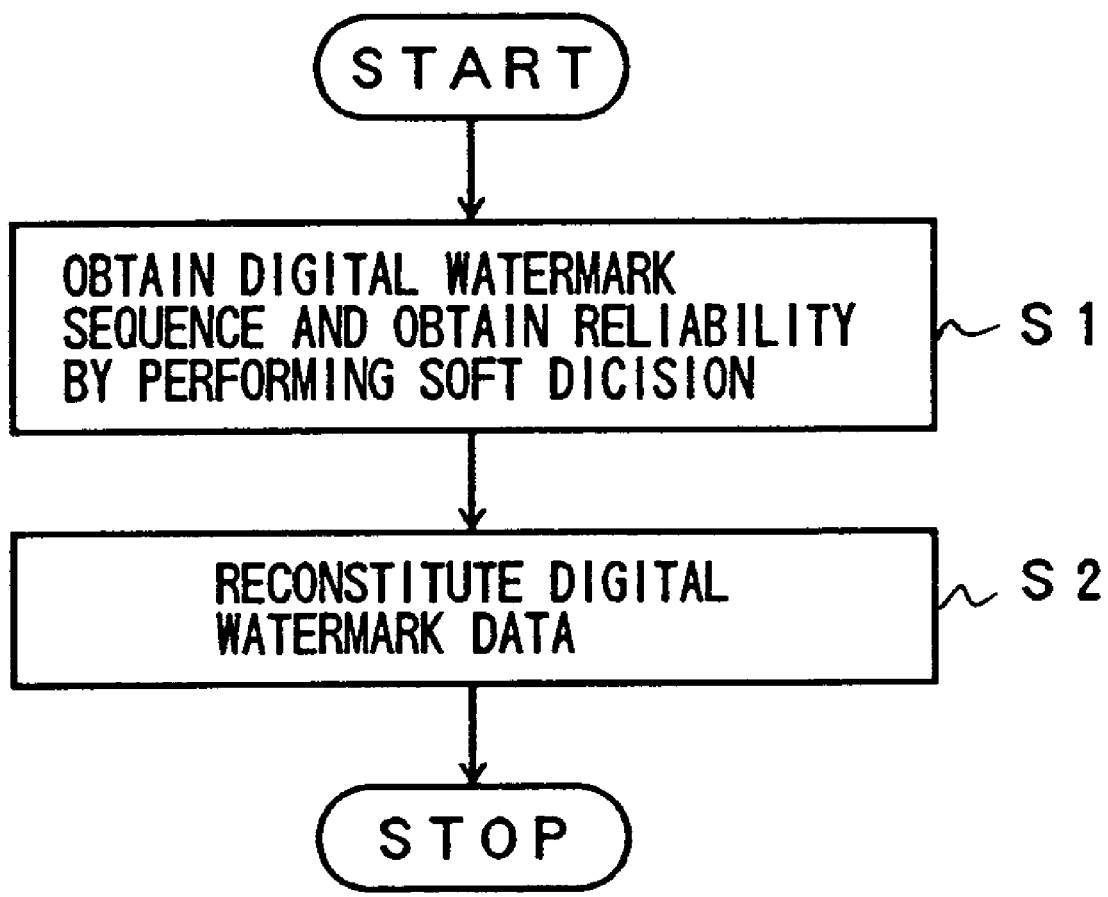
FIG. 31 is a flowchart showing a principle of a thirteenth embodiment of the present invention corresponding to a third object.

FIG. 31 is a diagram of a principle of the present invention corresponding to the third object. As shown in the figure, a watermark sequence and the reliability is obtained in step 1, and, then, most likely digital watermark data is reconstituted based on the watermark sequence and the reliability in step 2.

Figure 32:
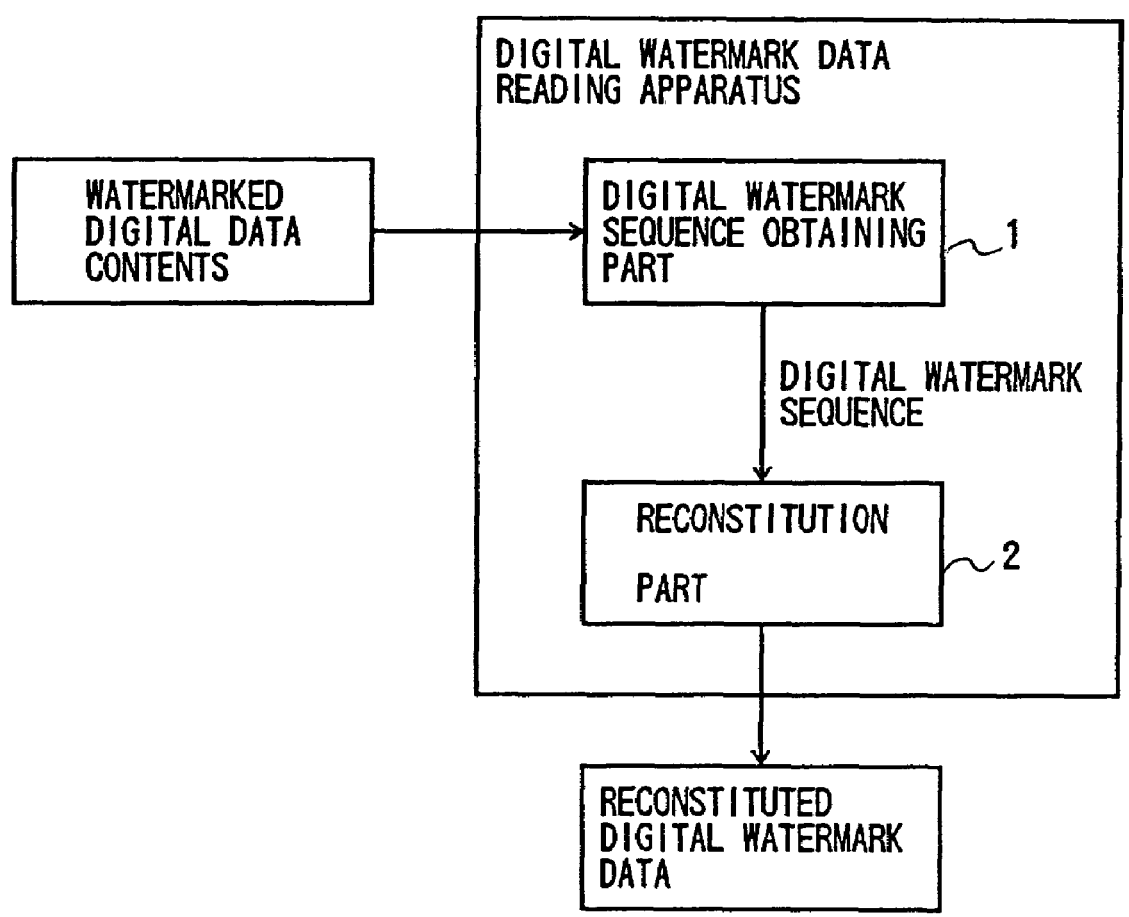
FIG. 32 is a block diagram of a digital watermark reading apparatus according to the thirteenth embodiment of the present invention.

FIG. 32 is a diagram showing a principle of a digital watermark reading apparatus of the present invention. As shown in FIG. 32, the digital watermark reading apparatus includes a digital watermark sequence obtaining part 1 and reconstitution part 2. The digital watermark sequence obtaining part 1 obtains the most likely digital watermark sequence and the reliability by carrying out soft decisions of coding theory using a weight function, and the reconstitution part 2 reconstitutes digital watermark data on the basis of the most likely digital watermark sequence and the reliability.

Inferring from the frequency plot shown in FIG. 30, it is easy to detect the digital watermark data sequence correctly if the repeating number of embedding is large enough. However, if a sufficiently large repeating number can not be obtained in actual practice, it becomes difficult to detect the desired digital watermark data sequence, thus filtering for watermarked content data becomes important. For example, concerning data which exists in the dotted circle in FIG. 30, it is difficult to determine whether the data is watermarked content data or noise. Thus, it is needed to separate watermarked content data from noise effectively. For that purpose, according to the present invention, weights are assigned to the digital watermark data sequence by using soft decisions of coding theory. Specifically, distribution of watermarked content data is predicted, then digital watermark data is reconstituted from a digital watermark data sequence to which a corresponding distribution value is added as the weight.

Accordingly, the watermarked content data can be separated from noise. Thus, error bits included in the digital watermark data sequence can be reduced, thereby a success rate of reading digital watermark data improves as compared with the above-mentioned conventional methods. According to the present invention, it becomes possible to see significant distribution bias in the watermark content data when the repeating number of embedding digital watermark data is small.

In the following, the present invention corresponding to the third object will be described in detail.

Figure 33:
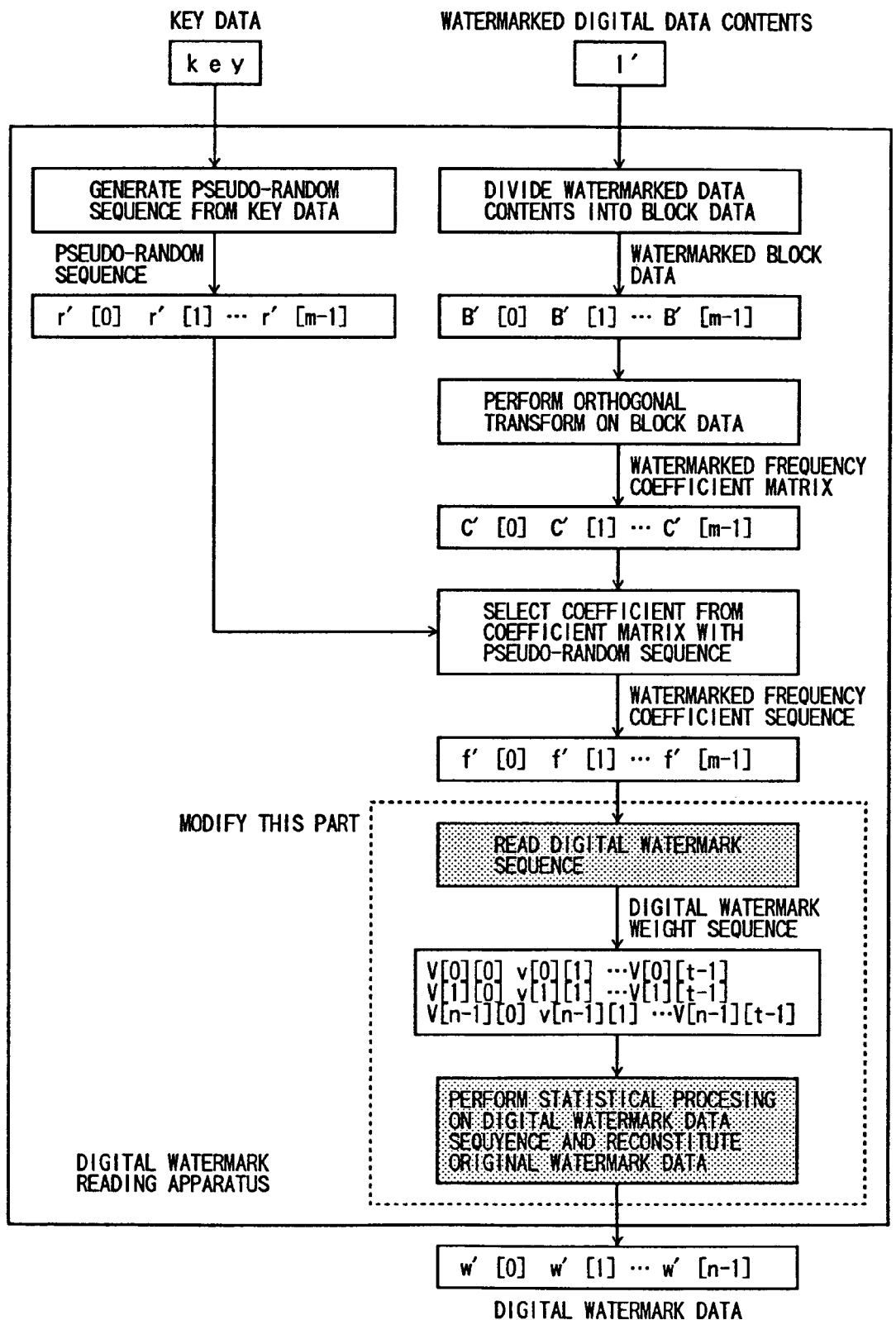
FIG. 33 is a general flowchart showing a digital watermark reading process according to the thirteenth embodiment of the present invention.

First, the operation of the digital watermark reading apparatus 106 will be described. FIG. 33 is a diagram for explaining the operation. As shown in FIG. 33, the process according to the present invention corresponds to the process shown in FIG. 5 in which steps 240-250 are improved.

As shown in FIG. 33, in the digital watermark reading apparatus 106, when reading digital watermark, $$[v[X][Y] = \text{weight}\left(\frac{f'[Y]}{q[i]}\right) - Z \times \{(Z \bmod 2) - 1\},$$

$$\text{for all } i \left(0 \leq i < \left\lfloor \frac{m}{n} \right\rfloor \cdot n\right),$$

by using frequency coefficient quantization width $q[0], q[1], \ldots, q[m-1]$. Here, $$X = \left\lfloor \frac{i}{t} \right\rfloor, \quad Y = i \bmod t, \quad Z = \left\lfloor \frac{f'[i]}{q[i]} + \frac{1}{2} \right\rfloor.$$

The function weight will be described later.

In the process for reconstituting digital watermark data by performing statistical processing on a digital watermark data sequence, for example, $$W[j] = \begin{cases} 1 & \sum_{k=0}^{t-1} v[j][k] \geq 0 \\ & \quad (0 \leq j < n) \\ 0 & \sum_{k=0}^{t-1} v[j][k] < 0 \end{cases}$$

is used for the reconstitution.

Thirteenth Embodiment

In the following, a thirteenth embodiment of the present invention will be described. In the following example, the digital watermark reading process based on quantization in the digital watermark reading apparatus 106 will be described.

According to the thirteenth embodiment of the present invention, the digital watermark embedding process is not changed from the conventional method. On the other hand, the digital watermark reading process is modified in order to improve digital watermark reading performance.

Here, let digital watermark data to be embedded in contents be $w_0, w_1, \ldots, w_{n-1}, w_i \in \{-1, 1\}$, $0 \leq i \leq n-1$, and let a data set in which digital watermark data is embedded be $\{d_{0,0}, d_{0,1}, \ldots, d_{0,m-1}, d_{1,0}, d_{1,1}, \ldots, d_{1,m-1}, \ldots, d_{n-1,1}, \ldots, d_{n-1,m-1}\}$. Let a quantization value used for quantize data $d_{i,j}$ ($0 \leq i \leq n-1$, $0 \leq j \leq m-1$) be $q_{i,j}$. Each bit data $w_i$ of digital watermark data is embedded m times repeatedly. The digital watermark embedding process based on quantization is assumed to be a process in the following.

For all $i$ and $j$ ($0 \leq i \leq n-1$, $0 \leq j \leq m-1$)

i) If $\left\lfloor \dfrac{d_{i,j}}{q_{i,j}} + \dfrac{1}{2} \right\rfloor \bmod 2$ is equal to $w_i$, $$d_{i,j} \text{ is changed to } \left\lfloor \dfrac{d_{i,j}}{q_{i,j}} + \dfrac{1}{2} \right\rfloor \times q_{i,j}.$$

ii) If $\left\lfloor \dfrac{d_{i,j}}{q_{i,j}} + \dfrac{1}{2} \right\rfloor \bmod 2$ is different from $w_i$ and $\left\lfloor \dfrac{d_{i,j}}{q_{i,j}} + \dfrac{1}{2} \right\rfloor$ is equal to $\left\lfloor \dfrac{d_{i,j}}{q_{i,j}} \right\rfloor$, $d_{i,j}$ is changed to $\left( \left\lfloor \dfrac{d_{i,j}}{q_{i,j}} + \dfrac{1}{2} \right\rfloor + 1 \right) \times q_{i,j}$.

iii) If $\left\lfloor \dfrac{d_{i,j}}{q_{i,j}} + \dfrac{1}{2} \right\rfloor \bmod 2$ is different from $w_i$ and $\left\lfloor \dfrac{d_{i,j}}{q_{i,j}} + \dfrac{1}{2} \right\rfloor$ is different from $\left\lfloor \dfrac{d_{i,j}}{q_{i,j}} \right\rfloor$, $d_{i,j}$ is changed to $\left( \left\lfloor \dfrac{d_{i,j}}{q_{i,j}} + \dfrac{1}{2} \right\rfloor - 1 \right) \times q_{i,j}$.

Here, $\lfloor x \rfloor$ is a maximum number which does not exceed x. "x mod y" represents the remainder of x divided by y.

The present invention is not only applicable to the contents in which digital watermark data is embedded in the above-mentioned way but also applicable to other contents in which digital watermark data is embedded in other equivalent way.

In the following, the operation of the digital watermark reading apparatus 106 will be described in detail.

According to a following process, a watermark sequence $\{\tilde{w}_{0,0}, \tilde{w}_{0,1}, \ldots, \tilde{w}_{0,m-1}, \tilde{w}_{1,0}, \tilde{w}_{1,1}, \ldots, \tilde{w}_{1,m-1}, \ldots, \tilde{w}_{n-1,0}, \tilde{w}_{n-1,1}, \ldots, \tilde{w}_{n-1,m-1}\}$ is read from a set of data values $\{\tilde{d}_{0,0}, \tilde{d}_{0,1}, \ldots, \tilde{d}_{0,m-1}, \tilde{d}_{1,0}, \tilde{d}_{1,1}, \ldots, \tilde{d}_{1,m-1}, \ldots, \tilde{d}_{n-1,0}, \tilde{d}_{n-1,1}, \ldots, \tilde{d}_{n-1,m-1}\}$ of the watermarked digital data contents 105 in which digital watermark data is embedded.

For all $i$ and $j$ ($0 \leq i \leq n-1$, $0 \leq j \leq m-1$)

$$n_{i,j} = \left\lfloor \dfrac{\tilde{d}_{i,j}}{q_{i,j}} + \dfrac{1}{2} \right\rfloor \text{ and}$$

$$\tilde{w}_{i,j} = \text{weight}\left( \dfrac{\tilde{d}_{i,j}}{q_{i,j}} - n_{i,j} \right) \times \{(n_{i,j} \bmod 2) \times 2 - 1\}.$$

Here, weight(x) (the domain is $$-\dfrac{1}{2} \leq x \leq \dfrac{1}{2},$$

and the range is equal to or more than 0. The function weight (x) will be called a weight function hereinafter) is a function which assigns weights to a read watermark sequence. By adopting a function which takes a large value in the vicinity of the central value (in the vicinity of the dotted vertical axis in FIG. 30) and takes a small value in the vicinity of the boundary of the bit value (in the dotted circle in FIG. 30), it becomes possible to separate effective watermark data sequence from noise.

Of course, it is possible to adopt a stretched weight(x) function in which the domain and the region is not limited. However, in the case, it is necessary to change the above mentioned formula to some extent.

Contents in which digital watermark data is embedded by digital watermark embedding processing is degraded due to data compression, media processing and the like. Thus, a watermark embedded data value $\tilde{d}_{i,j}$ deviates in some degree from a value $d_{i,j}$ of immediately after being embedded. Therefore, it is desirable to adopt a following function as the weight function. The function can be obtained such that the distribution of the ratio $$\dfrac{\tilde{d}_{i,j} - d}{q_{i,j}}$$

of the amount of the deviation between $d_{i,j}$ and $\tilde{d}_{i,j}$ to the quantization value $q_{i,j}$ is predicted, and it is normalized with an appropriate scale for approximation. (There is no condition for the scale.)

For example, when assuming that digital watermark data is read from watermarked motion pictures which are MPEG compressed, the distribution shown in FIG. 30 can be approximated by a Laplacian distribution. Thus, a Laplacian distribution of average 0 and variance 0.08 or a normal distribution of average 0 and variance 1/16 can be used effectively as the weighting function.

In addition, there is another method which uses another distribution function. The distribution function is formed so as to predict the error of the watermarked content data.

The digital watermark reading apparatus 106 reconstitutes and outputs digital watermark data $\tilde{w}_0, \tilde{w}_1, \ldots, \tilde{w}_{n-1}$ from read watermark sequence by applying, for example, $$W_i = \begin{cases} 1 & \sum_{j=0}^{m-1} \tilde{w}_{i,j} \geq 0 \\ -1 & \sum_{j=0}^{m-1} \tilde{w}_{i,j} < 0 \end{cases}$$

or Japanese patent-application No. 10-219236, "Embedding data coding method, the apparatus, computer readable medium storing embedding data coding program, read data decoding method, the apparatus, computer readable medium storing read data decoding program, digital watermark data coding method, the apparatus, computer readable medium storing digital watermark coding program, digital watermark decoding method, the apparatus, computer readable medium storing digital watermark decoding program".

In addition, the above-mentioned process performed by the digital watermark reading apparatus 106 can be constructed by a program which can be stored in a computer readable medium such as a disk unit, a floppy disk, CD-ROM and the like. That is, by installing the program in a computer such as one shown in FIG. 17, the processes of watermark reading of the present invention can be carried out. In addition, the digital watermark reading apparatus of the present invention can be realized by the integrated circuit shown in FIG. 18.

Experiments is performed in order to compare the method of the present invention and the conventional method of digital watermarking to motion pictures described in Japanese patent application No. 9-164466.

As experimental conditions, a unit for digital watermark processing is assumed to be a 16×16 pixel and the conventional digital watermark data sequence reading is assumed to be $\tilde{w}_{i,j}=(n_{i,j} \bmod 2) \times 2-1$ on the basis of the assumptions of the above-mentioned embodiment. Watermark data is reconstituted as $\tilde{w}_0 w_1, \ldots, w_{n-1}$ for both of the present invention and the conventional method.

Figure 34:
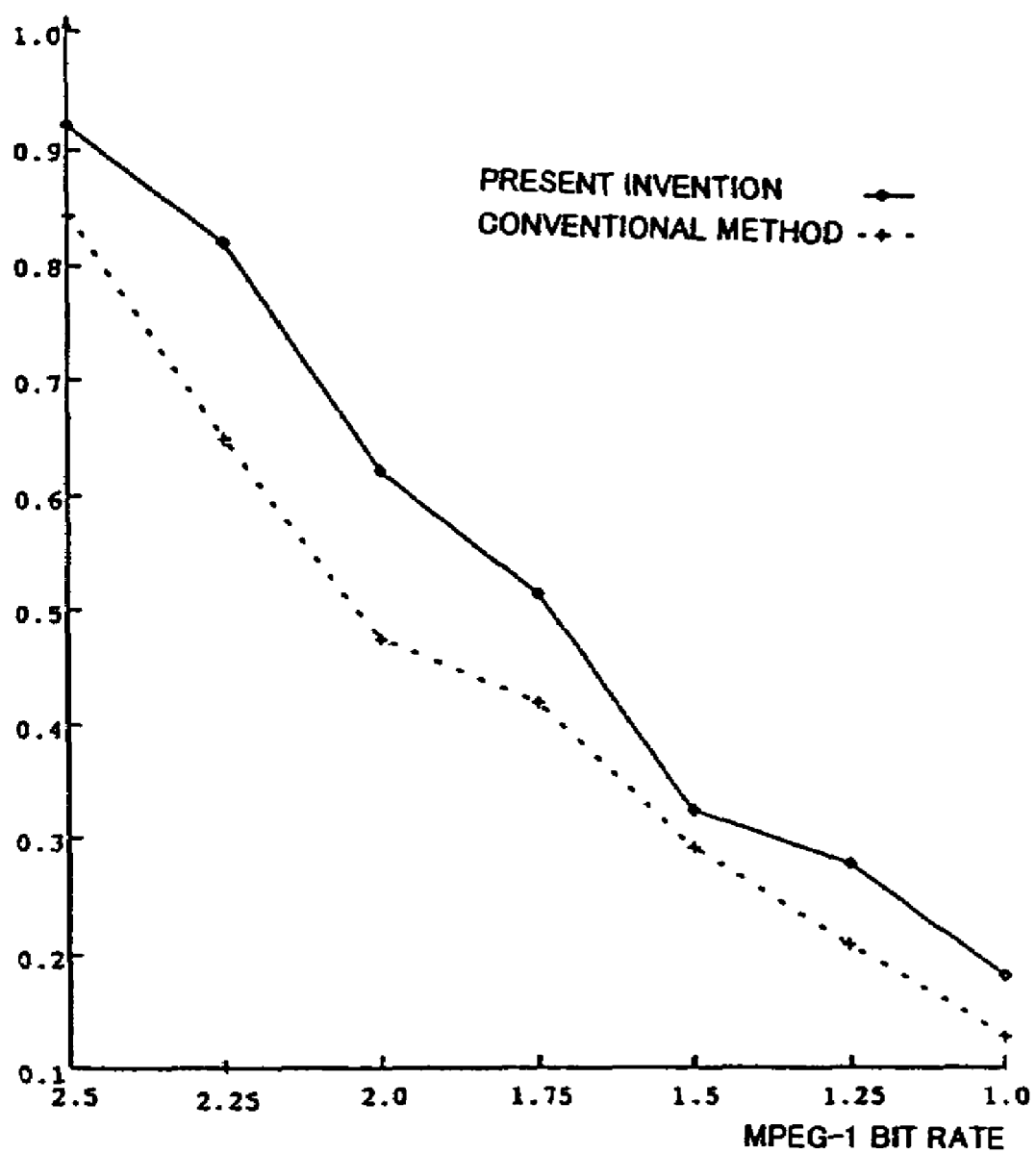
FIG. 34 is a diagram showing the result of comparison of a digital watermark data reading success rate between a conventional reading method and the present invention.

As shown in FIG. 34, it is recognized that digital watermark data reading success rate is improved in an MPEG-1 coded picture in any bit rates. The result shows the effectiveness of the present invention. Here, the digital watermark data reading success rate is obtained by dividing the number of correctly reconstituted digital watermark data by the total number of embedded digital watermark data.

According to the present invention, the digital watermark data sequence is separated from the noise so that error bits which are included in the digital watermark data sequence can be reduced, thereby the digital watermark data reading success rate is improved in comparison with the conventional method.

In addition, since weights are assigned to the digital watermark data sequence, the present invention is especially effective when the repeating number of watermark embedding is small.

The point of the present invention corresponding to the third objective is applying soft decisions for the digital watermark reading process as opposed to the conventional method which uses hard decisions. The present invention is not limited to the above-mentioned process and can apply to other equivalent digital watermarking method.

In the above-mentioned embodiments corresponding to first-third objects, embodiments corresponding to each object can be performed with embodiments corresponding to other objects.

The present invention is not limited to the specifically disclosed embodiments, and variations and modifications may be made without departing from the scope of the invention.

What is claimed is:

1. A method for embedding digital watermark data in digital data contents, said method comprising the steps of:
   receiving said digital data contents and said digital watermark data;
   dividing said digital data contents into block data;
   obtaining a frequency coefficient of said block data by performing an orthogonal transform;
   obtaining a complexity of said block data by performing a wavelet transform;
   obtaining an amount of transformation of said frequency coefficient from said complexity and said digital watermark data by using a quantization width such that the larger said complexity is, the larger said amount of transformation is;
   embedding said digital watermark data in said digital data contents by transforming said frequency coefficient by said amount; and
   generating watermarked digital data contents.

2. The method as claimed in claim 1, said step of obtaining said complexity of said block data comprising the steps of:
   transforming said block data, by applying a wavelet transform, into coefficients of said wavelet transform, and obtaining said complexity on the basis of the number of high frequency coefficients in said coefficients of said wavelet transform, each of said high frequency coefficients exceeding a threshold.

3. An apparatus for embedding digital watermark data in digital data contents, said apparatus comprising:
   a computer readable medium having program code executable by a processor, including:
   program code for performing the following:
   receiving said digital data contents and said digital watermark data;
   dividing said digital data contents into block data;
   obtaining a frequency coefficient of said block data by performing an orthogonal transform;
   obtaining a complexity of said block data by performing a wavelet transform; obtaining an amount of transformation of said frequency coefficient from said complexity and said digital watermark data by using a quantization width such that the larger said complexity is, the larger said amount of transformation is;
   embedding said digital watermark data in said digital data contents by transforming said frequency coefficient by said amount; and
   generating watermarked digital data contents.

4. The apparatus as claimed in claim 3, said obtaining of said complexity of said block data comprising:
   transforming said block data, by applying a wavelet transform, into coefficients of said wavelet transform, and obtaining said complexity on the basis of the number of high frequency coefficients in said coefficients of said wavelet transform, each of said high frequency coefficients exceeding a threshold.

5. An integrated circuit for embedding digital watermark data in digital data contents, said integrated circuit comprising:
   a computer readable medium having program code executable by a processor, including:
   program code for performing the following:
   receiving said digital data contents and said digital watermark data;
   dividing said digital data contents into block data;
   obtaining a frequency coefficient of said block data by performing an orthogonal transform;
   obtaining a complexity of said block data by performing a wavelet transform;
   obtaining an amount of transformation of said frequency coefficient from said complexity and said digital watermark data by using a quantization width such that the larger said complexity is, the larger said amount of transformation is;
   embedding said digital watermark data in said digital data contents by transforming said frequency coefficient by said amount; and
   generating watermarked digital data contents.

6. The integrated circuit as claimed in claim 5, said obtaining said complexity of said block data comprising: transforming said block data, by applying a wavelet transform, into coefficients of said wavelet transform, and obtaining said complexity on the basis of the number of high frequency coefficients in said coefficients of said wavelet transform, each of said high frequency coefficients exceeding a threshold.

7. A computer readable medium storing program code for causing a computer system to embed digital watermark data in digital data contents, said computer readable medium comprising:

program code means for receiving said digital data contents and said digital watermark data;

program code means for dividing said digital data contents into block data;

program code means for obtaining a frequency coefficient of said block data by performing an orthogonal transform;

program code means for obtaining a complexity of said block data by performing a wavelet transform;

program code means for obtaining an amount of transformation of said frequency coefficient from said complexity and said digital watermark data by using a quantization width such that the larger said complexity is, the larger said amount of transformation is;

program code means for embedding said digital watermark data in said digital data contents by transforming said frequency coefficient by said amount; and program code means for generating watermarked digital data contents.

8. computer readable medium as claimed in claim 7, said program code means for obtaining said complexity of said block data comprising:

program code means for transforming said block data, by applying a wavelet transform, into coefficients of said wavelet transform, and program code means for obtaining said complexity on the basis of the number of high frequency coefficients in said coefficients of said wavelet transform, each of said high frequency coefficients exceeding a threshold.

* * * * *

UNITED STATES PATENT AND TRADEMARK OFFICE
CERTIFICATE OF CORRECTION

PATENT NO. : 7,640,431 B2
APPLICATION NO. : 10/634155
DATED : December 29, 2009
INVENTOR(S) : Ogawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Ninth Day of November, 2010

David J. Kappos
*Director of the United States Patent and Trademark Office*